(12) United States Patent
Sakamoto et al.

(10) Patent No.: US 7,680,375 B2
(45) Date of Patent: Mar. 16, 2010

(54) PRODUCTION DEVICE AND PRODUCTION METHOD FOR AN OPTICAL DEVICE COMPONENT HAVING A GRATING STRUCTURE

(75) Inventors: Akira Sakamoto, Sakura (JP); Satoshi Okude, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/970,838

(22) Filed: Jan. 8, 2008

(65) Prior Publication Data

US 2009/0080827 A1 Mar. 26, 2009

Related U.S. Application Data

(62) Division of application No. 10/911,581, filed on Aug. 5, 2004, now Pat. No. 7,527,919.

(30) Foreign Application Priority Data

Aug. 5, 2003 (JP) .............................. 2003-206061

(51) Int. Cl.
*G02B 6/34* (2006.01)
*H01L 21/66* (2006.01)
(52) U.S. Cl. .................. 385/37; 385/123; 385/124; 385/141; 438/32
(58) Field of Classification Search .................. 385/14, 385/31, 37, 43, 123, 124, 129, 130, 131, 385/132, 141; 438/32
See application file for complete search history.

(56) References Cited

U.S. PATENT DOCUMENTS

| | | | | |
|---|---|---|---|---|
| 5,388,173 A * | 2/1995 | Glenn | ........................ | 385/37 |
| 6,067,391 A * | 5/2000 | Land | .......................... | 385/27 |
| 6,104,852 A * | 8/2000 | Kashyap | ..................... | 385/123 |
| 6,169,829 B1 * | 1/2001 | Laming et al. | ................ | 385/37 |
| 6,597,839 B2 * | 7/2003 | Mihailov et al. | .............. | 385/37 |
| 2009/0080827 A1 * | 3/2009 | Sakamoto et al. | ............. | 385/12 |

FOREIGN PATENT DOCUMENTS

| JP | 9-146161 A | 6/1997 |
|---|---|---|
| JP | 10-9511 A | 1/1998 |
| JP | 2000-57149 A | 2/2000 |

(Continued)

OTHER PUBLICATIONS

Aslund, et al., "Locking in photosensitivity within optical fiber and planar waveguides by ultraviolet preexposure", Optics Letters, vol. 24, No. 24, p. 1826-1828, Dec. 15, 1999.

(Continued)

*Primary Examiner*—Brian M Healy
(74) *Attorney, Agent, or Firm*—Sughrue Mion, PLLC

(57) ABSTRACT

A production device and a production method for a grating-type optical component enabling formation of a variety types of FBGs using a single phase mask and an optical component made by the production method or production device for a grating-type optical component are provided. The method involves diffusing at least one of hydrogen or deuterium into an optical fiber and altering the refractive index of the optical fiber by irradiating the fiber with non-interfering UV lamp light.

5 Claims, 22 Drawing Sheets

FOREIGN PATENT DOCUMENTS

| | | |
|---|---|---|
| JP | 2000-147975 A | 5/2000 |
| JP | 2000-264328 A | 9/2000 |

OTHER PUBLICATIONS

Aslund, et al., "Annealing properties of gratings written into UV-presensitized hydrogen-outdiffused optical fiber", Optics Letters, vol. 25, No. 10, p. 692-694, May 15, 2000.

Chen, et al., "157-nm $F_2$ laser photosensitivity and photosensitization in optical fibers", BThA5-1-3, Optical Society of America, 3 pages, (2001).

Chen, et al., "Strong 157-nm $F_2$-laser photosensitivity-locking of hydrogen-loaded telecommunication fibre for 248 nm fabrication of long-period gratings", Electronics Letters, vol. 38, No. 1, pp. 17-19, (Jan. 3, 2002).

* cited by examiner

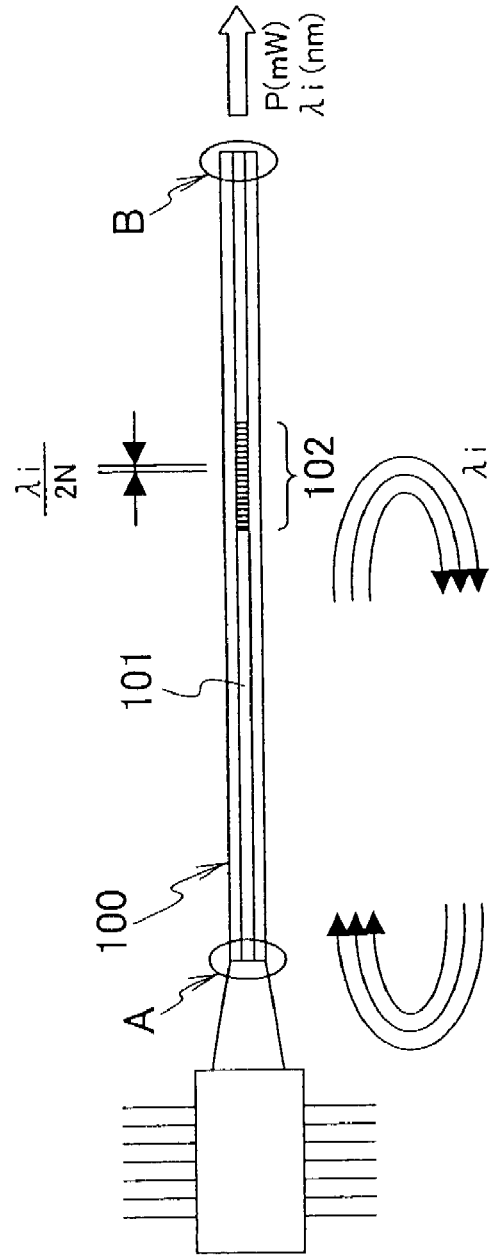
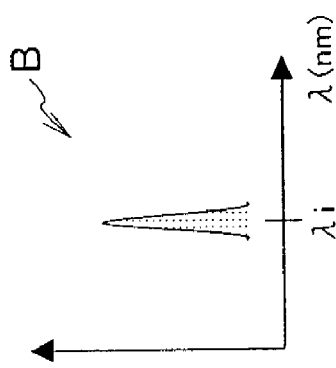
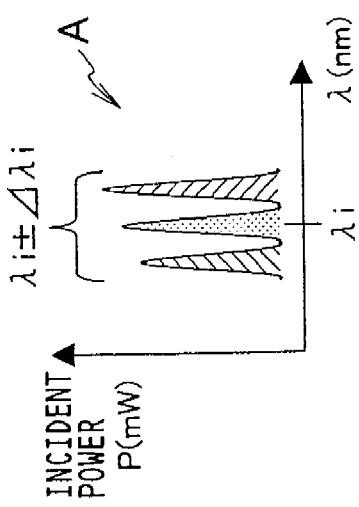
FIG. 1A RELATED ART
FIG. 1B RELATED ART
FIG. 1C RELATED ART

FIG. 7

| Gas used | WAVELENGTH(nm) |
|---|---|
| NeF | 108 |
| $Ar_2$ | 126 |
| $Kr_2$ | 146 |
| $F_2$ | 154 |
| ArBr | 161 |
| Xe | 172 |
| ArCl | 175 |
|  | 185 |
| KrI | 191 |
| ArF | 193 |
| KrBr | 207 |
| KrCl | 222 |
| KrF | 248 |
| XeI | 253 |
|  | 254 |
| $Cl_2$ | 258 |
| XeBr | 282 |
| $Br_2$ | 291 |
| XeCl | 308 |
| $I_2$ | 341 |
| XeF | 351 |
| HgI | 443 |
| HgBr | 503 |
| HgCl | 558 |

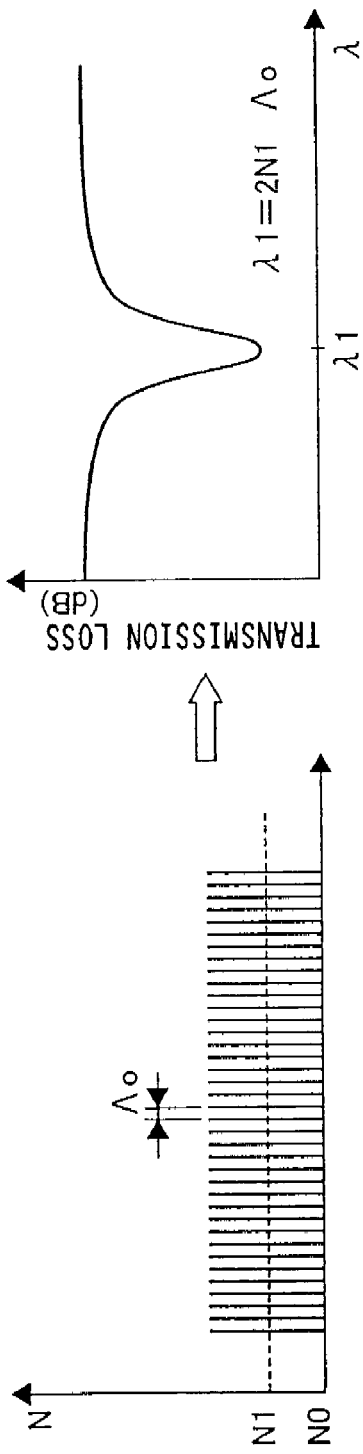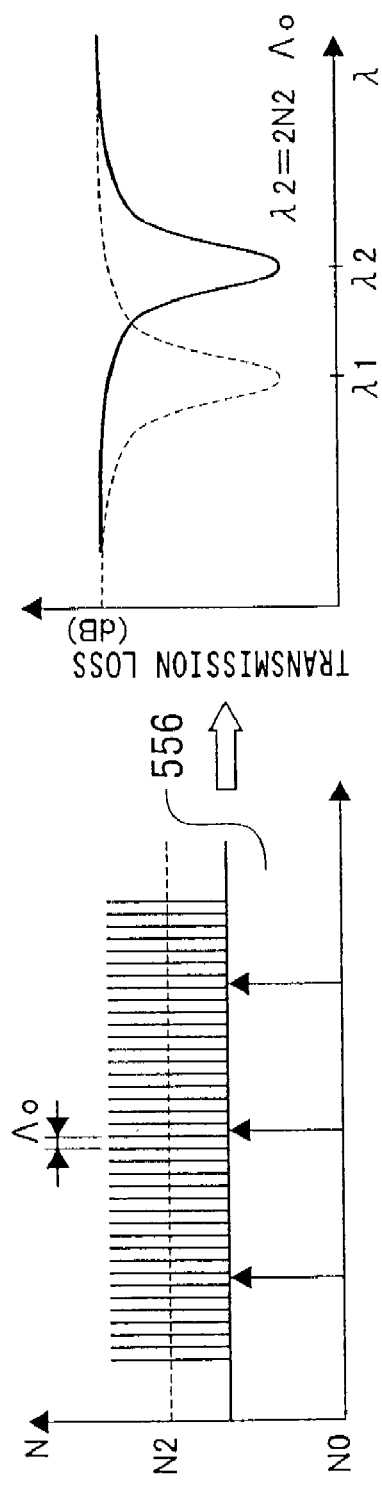

PRODUCTION DEVICE AND PRODUCTION METHOD FOR AN OPTICAL DEVICE COMPONENT HAVING A GRATING STRUCTURE

BACKGROUND OF THE INVENTION

1. Field of the Invention

The present invention relates to an optical waveguide having photosensitivity in the core thereof, and more specifically to a production device for a grating-type optical component and a production method for a grating-type optical component, the properties of which are adjusted by changing the refractive index thereof using ultraviolet light (hereinafter "UV") and to an optical component made using the production device for a grating-type optical component or production method for a grating-type optical component.

2. Description of the Related Art

Quartz is a material having excellent optical transmission qualities and is therefore used in a variety of applications such as optical lenses or waveguides for optical transmission or the like. The material of an optical fiber as an optical communications line is silica based, when producing functional optical components such as an optical wavelength selection filter, an optical splitter, a spectral separator or attenuator or the like in that line, there are merits, in terms of compatibility with optical fiber (the refractive index, core diameter, and fusion point when making a fusion connection), to produce such functional components of quartz.

In an optical waveguide such as a planar light wave circuit (PLC) or an optical fiber including photosensitive material such as Ge, phosphorus or boron added in the core, a grating is formed by irradiating UV light of an appropriate wavelength into the optical waveguide from the side thereof so as to alter the refractive index inside the core periodically, in a longitudinal direction; such gratings comprise optical components used as an above-mentioned wavelength selection filter. As shown in FIG. 1A, in accordance with the desired objective, the refractive index is varied at a determined periodicity following in a longitudinal direction of the optical waveguide 100. Further, besides a gradual, successive alteration, this alteration may be of an irregular or discontinuous periodicity.

The grating 102 formed in the core 101 of the optical fiber 100 is called an optical fiber grating. Normally, the optical fiber grating is classified by the period of refractive index variation. One is long period grating whose period of refractive index variation is above 100 μm, and the other is fiber Bragg grating (hereafter "FBG") whose period of refractive index variation is below a few micro meters. These are important optical components in the field of optical transmission.

In the description following, optical fiber refers to optical waveguides. In the same manner, FBG in the description refers to a grating formed inside an optical waveguide.

When the period of refractive index variation of an FBG formed in a core is determined as Λ, wavelength λ of light reflected at the FBG satisfying the expression $$\lambda = 2 \cdot n_{eff} \cdot \Lambda_0 \qquad (1).$$

Here, $n_{eff}$ is the effective refractive index of the FBG and $n_{eff}$ is nearly equal to 1.46 at the silica-based core. As an example, if the above expression (1) is applied to wavelength λ=1550 nm used in public (commercial) optical transmission networks, then FBG pitch $\Lambda_0 \approx 500$ nm=0.5 μm is obtained.

A conventional method for producing an FBG will now be described. Referring to FIG. 2A, firstly optical fiber 127 is disposed inside pressurized container 111. A kilometer or from several hundred to tens of meters of reeled optical fiber covered with protective coating, optical fiber covered with protective coating cut into several meter lengths, or optical fiber 127 as shown in the drawing cut into several meter lengths having a part of the covered protective coating material part 129 removed to expose the inner part are all suitable for use as the optical fiber 127.

Next, in a condition loaded with hydrogen ($H_2$) or deuterium ($D_2$) and in a pressurized condition (e.g.: 10 MPa-30 MPa), high-pressure hydrogen 113 or deuterium is diffused through the cladding 125 of the optical fiber 127 reaching the core 123. This process is known as hydrogen diffusion treatment.

The object of the above hydrogen diffusion treatment is that if hydrogen or deuterium are diffused into the core 123 of the optical fiber 127 then, as will be described subsequently, the photosensitivity of the core 123 can be increased when an interfering UV laser beam is radiated to the core 123. In other words, it is known that when imprinting an FBG, defusing hydrogen or deuterium in a core, here core 123, raises the speed of the increase of the refractive index approximately fiftyfold in comparison to a core that has not been diffused with hydrogen or deuterium. It is well known that in such a condition, raising the temperature inside the pressurized container above room temperature raises the speed of this diffusion.

When, in this hydrogen diffusion treatment, the optical fiber 127 has been diffused with hydrogen or deuterium, the covering material part 129 must be removed to radiate UV laser rays therein. This is because the covering material part 129, of resin, diffused with the hydrogen, absorbs UV laser light thereby preventing the rays from reaching the core.

Next, as highly interfering UV laser light 171 is radiated through a phase mask 173 having a specific periodicity, a fringe pattern of the interference arises in the hydrogen diffused optical fiber core 123; the density of energy being higher, and thereby raising the refractive index, in the bright portions of this UV pattern. Usually, interference of diffracted light of first order through the phase mask is used, the resulting interference fringe being half the period of the phase mask such that the period of the FBG is half the period of the phase mask. An FBG (hydrogen diffused) 121 having an uniform period can be formed in this way. The process itself is known as UV exposure processing.

As shown in FIG. 2C, the optical fiber with imprinted FBG is then placed in an oven 151 for a determined period of time (e.g. 12 hours) in a heated condition (120° C.) so that the hydrogen 153 or deuterium diffused into the optical fiber 127 is released to the outside. This process is called the hydrogen removal process. The optical fiber 117 shown in FIG. 2C is an optical fiber with hydrogen removed through the hydrogen removal process, and the optical fiber covering part 119 thereof is a cladding, the hydrogen in which has been removed in the same manner.

An optical fiber having a refractive index periodically distributed at a constant pitch $\Lambda_0$ in the core thereof inside a cladding produced in this way, as shown in FIG. 1A, is called a uniform type FBG. In a uniform type FBG reflection occurs at multiple points in phase in relation to signal light of wavelength $\lambda_i$ satisfying the above expression (1), among signal light propagating in the core. Appropriate applications can be found in FBG for stabilization of wavelengths of laser diodes ("LD") or FBG for Add/Drop for adding or dropping light with specific wavelengths.

Where the pitch Λ of an FBG inside a core changes successively and gradually (e.g. $\Lambda_1$-$\Lambda_n$), the FBG is said to be a chirped type FBG. This kind of FBG has broad bandwidth and is effective for multiple wavelengths. Appropriate applications can be found in FBG for compensating chromatic dispersion and FBG for equalizing gain after amplification by an optical amplifier.

SUMMARY OF THE INVENTION

The above-described conventional methods however, only allow for imprinting of FBG having the same type of pitch from one type of mask as the periodicity of the FBG is determined by the phase mask. Thus, in order to create FBG's having different properties, a variety of different phase masks are required leading to increased production costs.

With the foregoing in view, the present invention provides a method for production of a grating-type optical component that is superior in terms of facilitating mass production and enables formation of a variety of types of FBG using a single phase mask, a production device for producing that grating-type optical component and an optical component made using that production method or production device for a grating-type optical component.

In a first technical aspect of the present invention the method for production of a grating-type optical component includes the steps of: radiating a monochromatic light of the ultraviolet region onto a silica-based optical waveguide diffused with at least one of hydrogen or deuterium so as to alter the refractive index of the silica-based optical waveguide and radiating interfering light to the quartz optical waveguide. Further, the first aspect includes an optical component created using the production method.

In a second technical aspect of the present invention the production device for producing a grating-type optical component includes: a light source for generating a monochromatic light of the ultraviolet region, a primary irradiation system for radiating that monochromatic light to a silica-based optical waveguide diffused with at least one of hydrogen or deuterium and a secondary irradiation system for radiating interfering light to the silica-based optical waveguide. Further, the second aspect includes an optical component created using the production device.

BRIEF DESCRIPTION OF THE DRAWINGS

FIG. 1A is an explanatory drawing depicting an FBG for wavelength stabilization in which incident power in relation to wavelength is illustrated in FIG. 1B as a graph, and transmission power in relation to wavelength is illustrated in FIG. 1C as a graph;

FIG. 7 shows the relationship between wavelength and gas used in an excimer lamp;

FIG. 8A shows the properties of an FBG formed using a method of the prior art;

FIG. 8B shows the properties of an FBG formed using a method according to the present invention;

DESCRIPTION OF THE PREFERRED EMBODIMENTS

The preferred embodiments of the present invention will now be described with reference to the drawings.

First Embodiment

FIGS. 3 and 4 illustrate the production method for a grating-type optical component related to the first embodiment of the present invention.

Figure 2A:
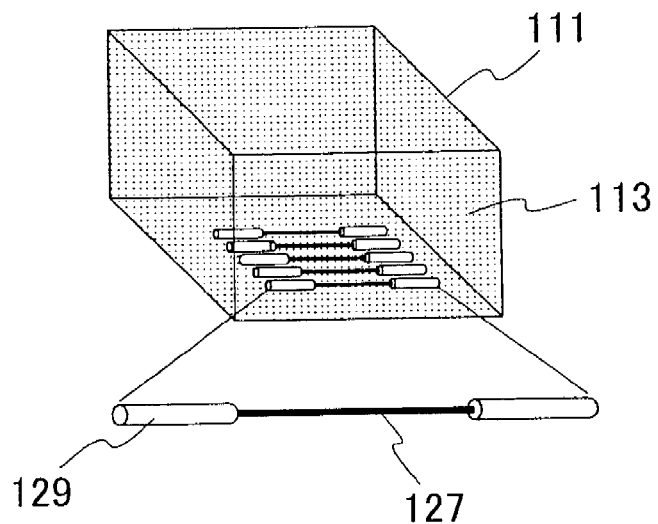
FIG. 2A depicts a conventional method for the hydrogenation process.
Figure 2B:
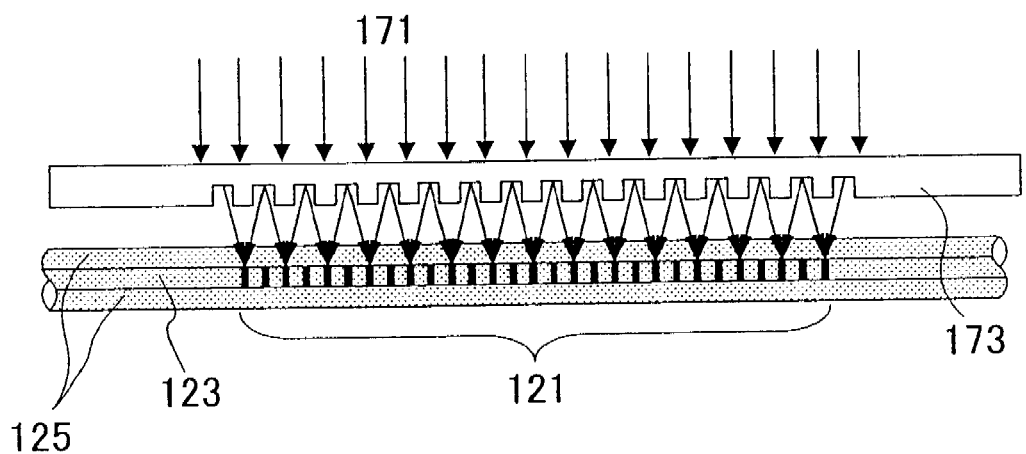
FIG. 2B depicts the UV exposure process.
Figure 2C:
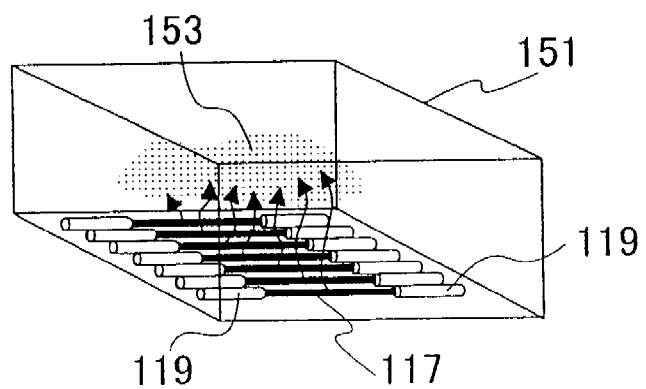
FIG. 2C depicts the hydrogen removal process.
Figure 3A:
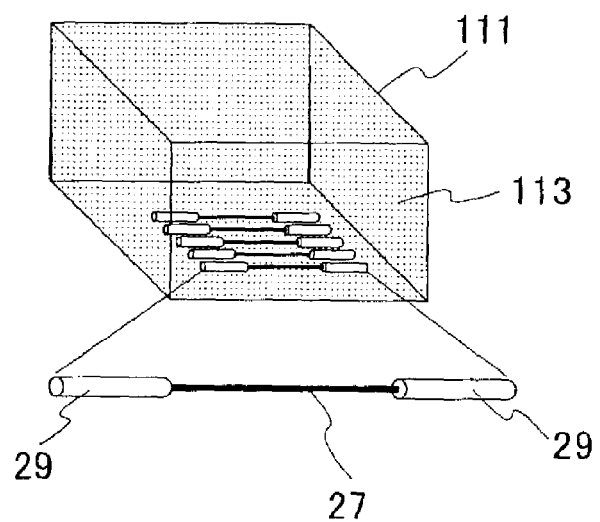
FIG. 3A illustrates process 1 related to the first embodiment of the present invention.

As shown in FIG. 3A an optical fiber 27 is placed inside a pressurized container 111. Several kilometers or from several hundred to tens of meters of reeled optical fiber covered with protective coating, covered optical fiber cut into several meter lengths, or optical fiber 27 as shown in the drawing cut into several meter lengths having a part of the covering material part 29 removed to expose the inner part, are all suitable for use as the optical fiber 27.

Step 1 Hydrogen Diffusion Process

Next, the optical fiber is left in a hydrogen ($H_2$) or deuterium ($D_2$) loaded, pressurized condition (e.g.: 10 MPa-30 MPa) and high-pressure hydrogen 113 or deuterium is diffused through the cladding 25 of the optical fiber 27 reaching the core 23. Where for example the diameter of the silica-based part is 125 μm, if pressurized at 55° C., the optical fiber must remain in that condition for a period of five days.

If hydrogen or deuterium is diffused into the core 23 of the optical fiber 27 then, as will be described subsequently, the photosensitivity of the core 23 can be increased when an interference capable UV laser beam is radiated to the core 23.

Step 2 Raising Refractive Index

Figure 3B:
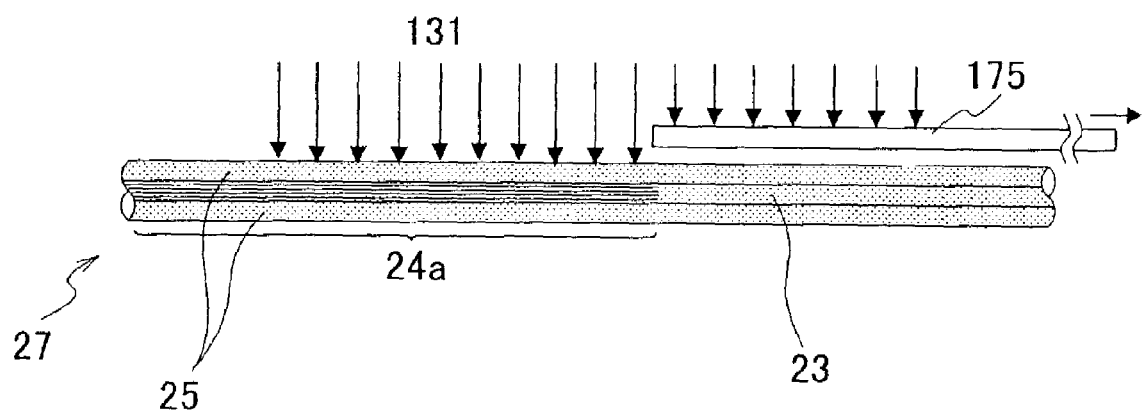
FIG. 3B illustrates process 2 related to the first embodiment of the present invention.

As shown in FIG. 3B, non-interfering UV light (hereinafter "UV light") is then radiated to irradiation region 24a of the optical fiber 27 diffused with hydrogen or deuterium, using non-interfering UV lamp light 131 that radiates over a broad area. An excimer lamp that generates incoherent, monochromatic light is one example of a preferred light source for this non-interfering UV lamp light. Here, non-interfering refers to incoherent light that does not create interference.

In step 2 above, as the UV light is irradiated, the power of this radiation is adjusted allowing the refractive index of the optical fiber 27 to be adjusted. In addition to adjusting the power of light radiated from a light source, adjusting the integrated power of radiation here can be performed by adjusting the duration thereof or by using the following methods for performing adjustment of the refractive index.

Figure 5A:
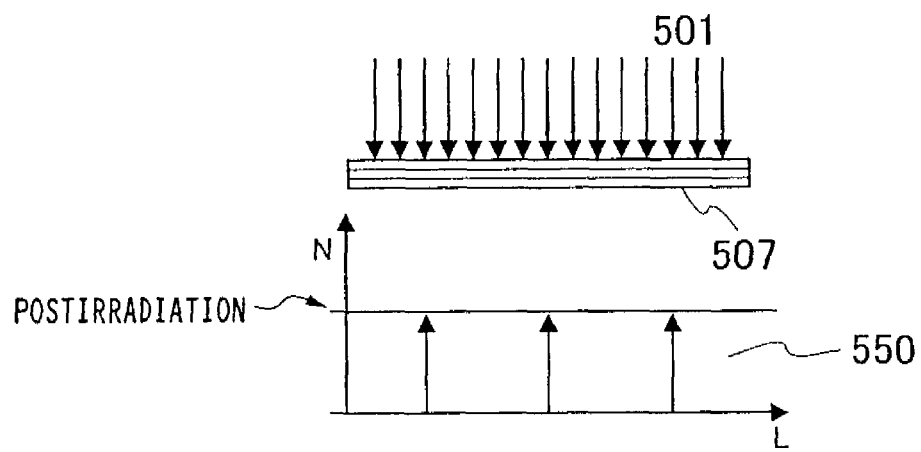
FIG. 5A illustrates changes in the refractive index of an optical fiber when non-interfering UV light is uniformly radiated over an entire optical fiber.

For example, as shown in FIG. 5A, raising the base line level of refractive index (refractive index profiles) 550, of the entire optical fiber by radiating a fixed power of non-interfering UV light 501 over the entire optical fiber 507 can be used.

Figure 5B:
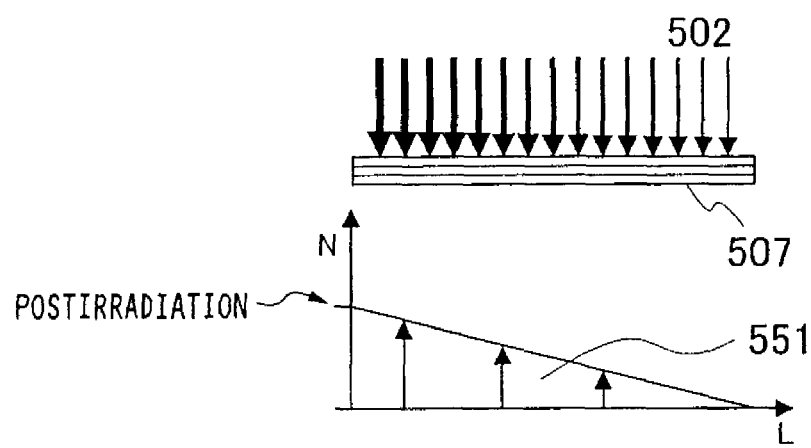
FIG. 5B illustrates changes in the refractive index of an optical fiber as non-interfering UV light is radiated, when the amplitude of the radiated UV light is changed along the optical fiber.

Further, as shown in FIG. 5B, a changing of the refractive index in a longitudinal direction of an optical fiber 507 in which the degree of increase in the refractive index is adjusted in different portions of the optical fiber 507 by radiating varying quantities of non-interfering UV light 502 to those portions can also be used. This raising the refractive index 551 results in a transition in the refractive index as indicated by the sloping line in FIG. 5B.

Figure 5C:
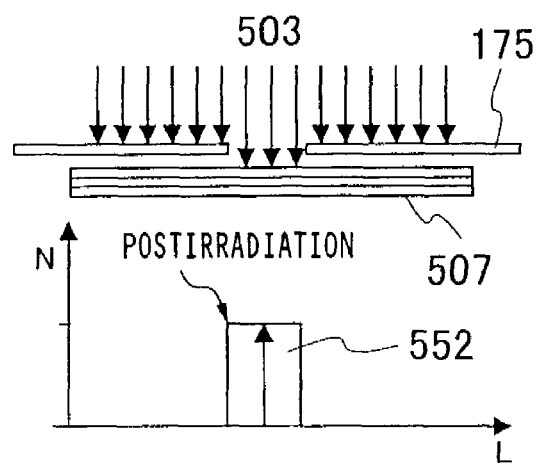
FIG. 5C illustrates changes in the refractive index of an optical fiber when part of an optical fiber is radiated with non-interfering UV light using amplitude mask 175.

Again, as shown in FIG. 5C, there can be a raising of the refractive index 552 applied to only a part of an optical fiber, achieved by radiating only specific portions of the optical fiber with UV light 503 by using an amplitude mask 175 having slits disposed in parts thereof or using two masks 175 to block part of the UV light radiated.

Figure 6A:
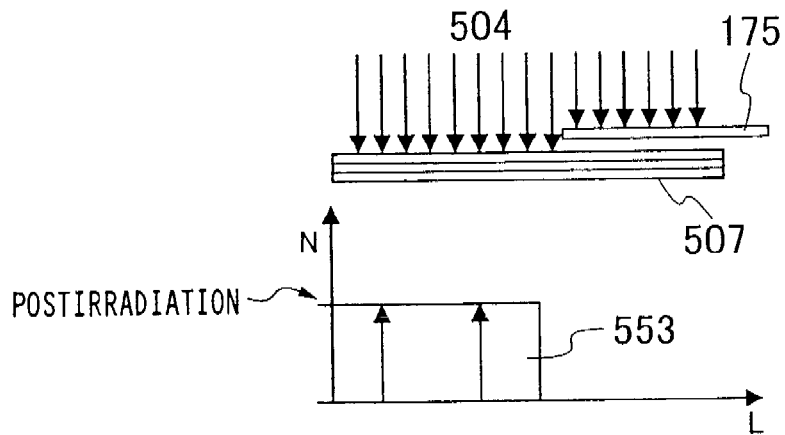
FIG. 6A illustrates changes in the refractive index when part of an optical fiber is radiated with non-interfering UV light using amplitude mask 175.

Further, as shown in FIG. 6A, there can be a raising of the refractive index 553 in only a part of one side of an optical fiber 507 by using an amplitude mask 175 having slits that maintains a constant power of UV light 504.

Figure 6B:
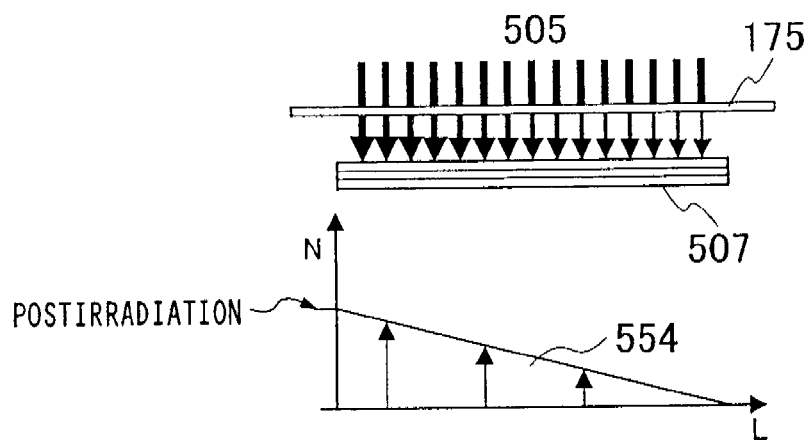
FIG. 6B illustrates changes in the refractive index as non-interfering UV light is radiated, when the amplitude of the radiated non-interfering UV light is changed along the optical fiber by using the amplitude mask 175.

As shown in FIG. 6B, by radiating UV light 505 via an amplitude mask 175 in which the rate of permeation of light is disparate in different places, the degree of the increase in the refractive index can be adjusted in relation to a location, thereby enabling the refractive index to be altered following a longitudinal direction of the optical fiber 507. This raising of the refractive index from the bottom up 554 can be adjusted with changes in the properties of the amplitude of the adjusting mask used, as illustrated by the sloping line in the example on FIG. 6B.

Figure 6C:
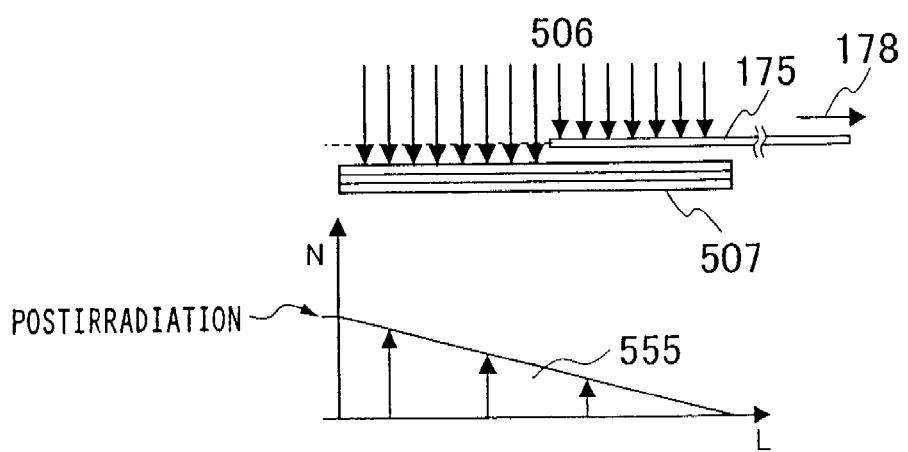
FIG. 6C illustrates changes in the refractive index of an optical fiber when the time of exposure to non-interfering UV light radiated thereto is changed along the optical fiber by moving (178) the amplitude mask 175.

Moreover, as shown in FIG. 6C, the refractive index can be altered following a longitudinal direction of the optical fiber 507 by adjusting the duration of exposure of the UV light through adjusting the speed of movement of the amplitude mask 175 having slits, that maintains a constant power of UV light 506 radiated, as that mask is moved. This raising of the refractive index from the bottom up 555, can be adjusted by controlling the movement 178 of the amplitude mask 175, as illustrated by the sloping line in the example of FIG. 6C. FIG. 3B illustrates the case where the method of FIG. 6C is used.

Although the required wavelengths of UV light used in order to obtain the above described changes in the refractive index is dependent to some degree on the sensitizing material added, normally wavelengths of below 280 nm are required. This is because it is difficult to obtain the desired refractive index with extremely low photosensitivity. On the other hand, at below 150 nm, there is an extremely high rate of light absorption by pure quartz having no sensitizing material, such that light cannot penetrate; accordingly the wavelength of radiated light must be above 150 nm.

For this reason light sources generating light of wavelengths in the region between 150 and 280 nm from among those excimer lamps shown in FIG. 7 can be used. Among those the 222 nm lamp using KrCl and the 172 nm lamp using Xe are the most convenient, as they can be economically obtained and provide stable lamp functions because they are used for cleaning purposes on liquid crystal panels and the like.

An excimer lamp, as opposed to an excimer laser, can be used for a UV light source. Whereas the power intensity of the laser is 1000 times that of the lamp, the lamp can radiate light over a broader area, 500×80 mm. A small type excimer lamp can be as small as 20 mm×18 mmϕ and is approximately one tenth the cost of a laser light source, while light radiated from an excimer lamp for a long period is not highly conducive to deterioration in the mechanical strength of silica-based material of an optical fiber, and the 100V or 200V power supply used by the lamp makes for compatibility with ordinary commercial power supply voltage. Further, as the power density of an excimer lamp is low compared to that of a laser lamp, light from the excimer lamp does not cause damage to an optical waveguide during the exposure period.

Step 3 Hydrogen Removal Process

Figure 4A:
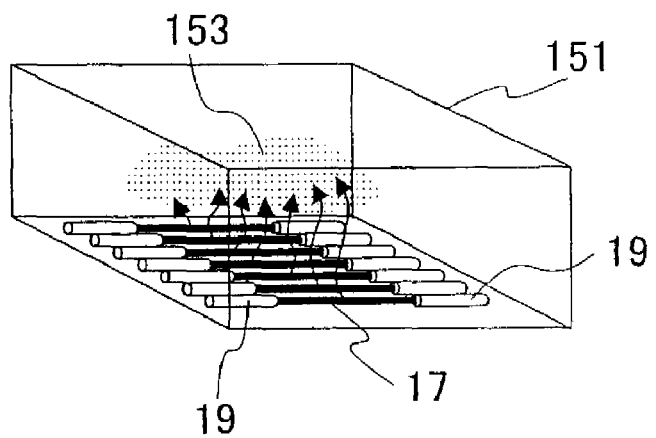
FIG. 4A illustrates process 3 related to the first embodiment of the present invention.

Referring to FIG. 4A, the optical fiber 27 is placed inside an oven 151 and left therein for a set duration (12 hours), remaining in a heated condition (120° C.), enabling the hydrogen 153 or deuterium diffused in the optical fiber 27 to be released to the outside.

Figure 4B:
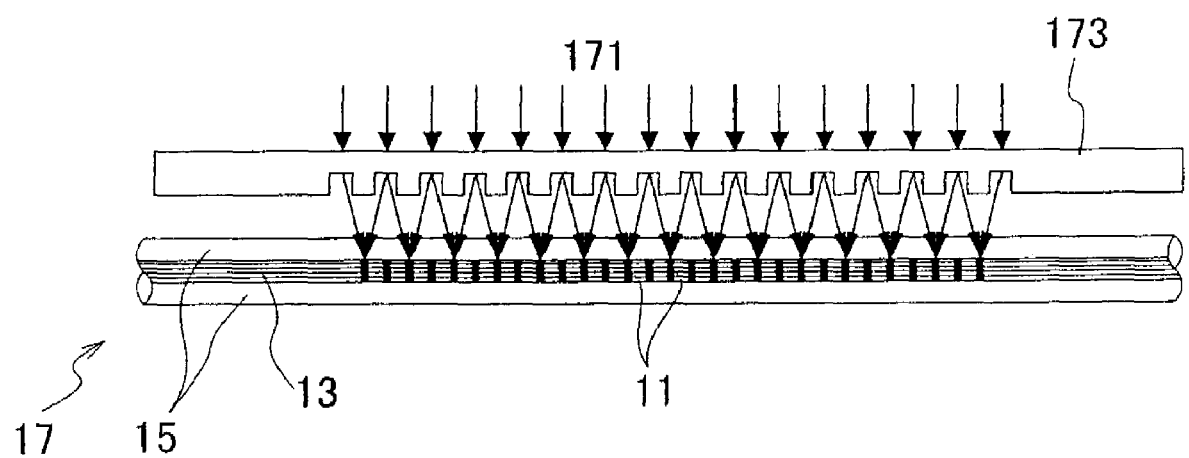
FIG. 4B illustrates process 4 related to the first embodiment of the present invention.

Numeric 17 in FIG. 4A, indicates the optical fiber with hydrogen removed therefrom. Numeric 15 in FIG. 4B is the cladding with hydrogen removed and numeric 13 in that figure is the core with hydrogen removed.

As due to this step, the density of remaining hydrogen or deuterium inside the optical fiber 17 is lowered sufficiently, even where there is a long period of standby in which the optical fiber is kept before the subsequent step, basically no changes occur in the properties of the optical fiber during that time. Even with the hydrogen or deuterium thus removed however, photosensitivity to UV laser light during the formation of the FBG is still maintained. It is a characteristic of this invention that the photosensitivity of the core does not decrease after removal of the hydrogen or deuterium to the extent that occurs when technology of the present invention is used.

Silica-based material that has undergone the above-described steps has increased photosensitivity and the deterioration over time of that photosensitivity is small, thereby enabling creation of an optical waveguide type optical component.

Further, in addition to each of the above steps, a step 4 enables formation of an FBG by radiating interfering UV light to the optical fiber. Normally, a light source having an interfering effect such as a laser or the like that utilizes changes in amplitude through the interference of light, is used in order to change the refractive index of a core. The second harmonic of an argon ion laser or an excimer laser can be used to provide such a light source.

An example of a short period FBG formed using a phase mask 173, as shown in FIG. 4B, provides an example of the first embodiment of the FBG production method of the present invention. Here, as interfering UV light 171 is radiated through a phase mask 173 having a fixed periodicity, a fringe pattern arises in the core 13 (having no hydrogen) of the optical fiber, the refractive index of the core being raised at points exposed to the high brightness of the UV. FBG 11 (having no hydrogen) having a fixed period can be formed in this way. In addition to this method of using a phase mask as a method of forming an FBG, a twin beam interference method can also be used.

Generally, as shown in FIG. 8A, the reflected center wavelength $\lambda$ determined from the pitch $\Lambda_0$ of a uniform type FBG formed using this method, results in $\lambda=2N_1\Lambda_0$ when expression (1) is applied. $N_1$ is the effective refractive index in the FBG region.

An FBG formed by step 1 of the method of this invention has the refractive index raised by UV lamp light, such that the reflection central wavelength is changed, becoming longer. Where the refractive index of an entire core of an optical fiber is raised, 556 as shown in FIG. 8B, the reflected center wavelength is $\lambda_2=2N_2\Lambda_0$, and there is a shift toward longer wavelengths. Here, $N_2$ is the effective refractive index of FBG regions having raised refractive index.

Figure 9A:
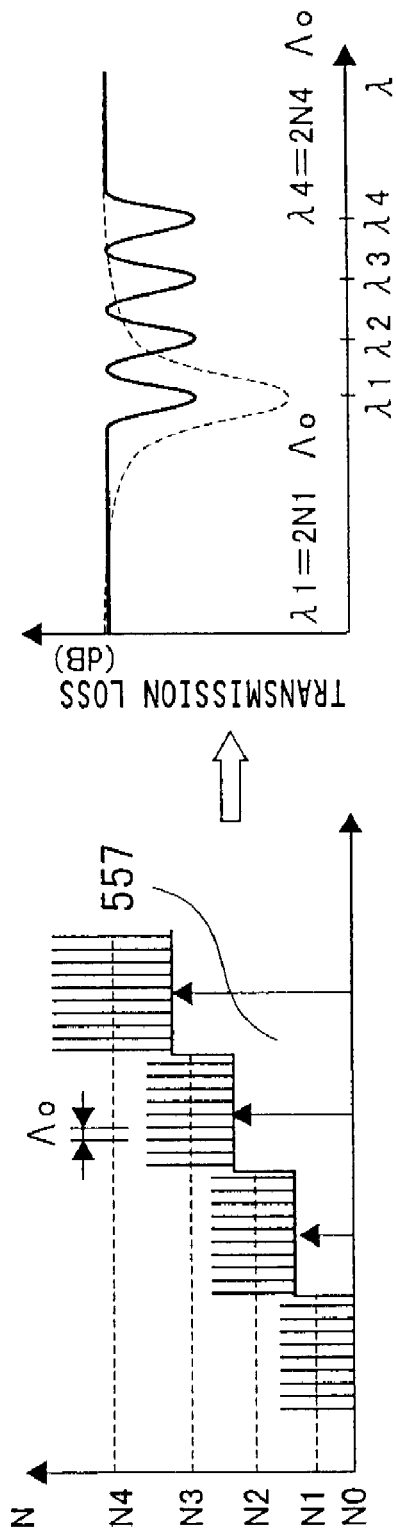
FIG. 9A shows the properties of an FBG formed using a method according to the present invention.
Figure 9B:
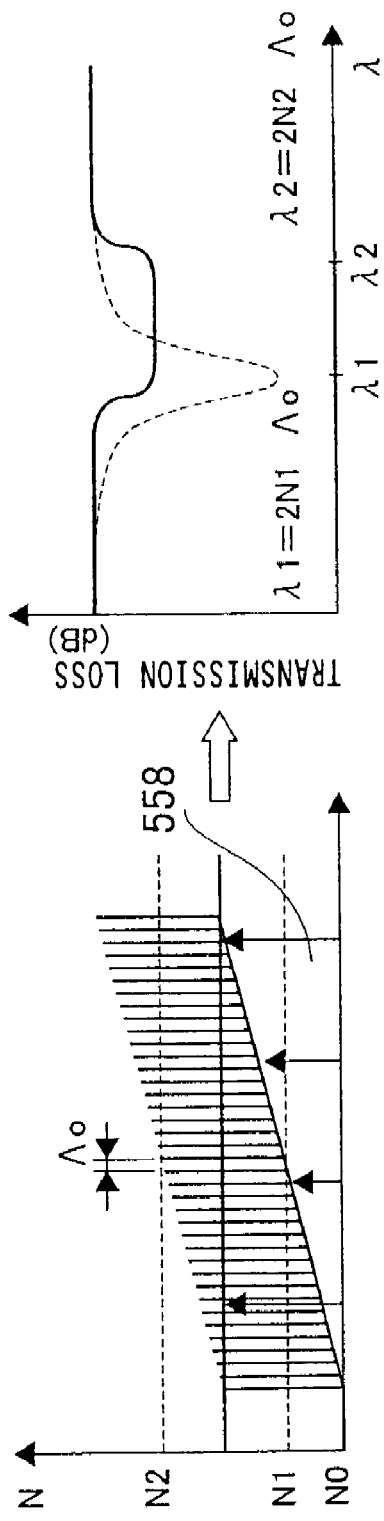
FIG. 9B shows the properties of an FBG formed using a method according to the present invention.

FIG. 9A shows the case where four levels of refractive index are formed using a graded form of raising of refractive index. These four levels of effective refractive index of an FBG are termed, respectively, $N_1$, $N_2$, $N_3$ and $N_4$ ($N_1<N_2<N_3<N_4$). Four values exist for the reflection central wavelength, respectively, $\lambda_1=2N_1\Lambda_0$, $\lambda_2=2N_2\Lambda_0$, $\lambda_3=2N_3\Lambda_0$, $\lambda_4=2N_4\Lambda_0$ ($\lambda_1<\lambda_2<\lambda_3<\lambda_4$). The FBG with four refractive indexes is equivalent to a combination of four FBGs, each has one refractive index and a different period of those four ones.

Where the sloping raising of refractive index 558 is formed, as shown in FIG. 9B, as the refractive index gradually increases in a longitudinal direction of the optical fiber, the reflection central wavelength also gradually changes toward the longer wavelength side, such that reflection arises in some wavelength bandwidths, resulting in the appearance of transmission loss in those bandwidths.

The results of an FBG of this embodiment experimentally produced will now be described. The optical fiber of the optical waveguide was single mode optical fiber, with approximately 3.5 Wt % $GeO_2$ added, the core diameter being approximately 10 μm and the difference in a specific refractive index between the core and cladding being 0.35%. This optical fiber was placed in a 55° C., 10 MPa hydrogen atmosphere and left there for one week to allow the hydrogen to penetrate through to the center part of the optical fiber. The UV-curable resin providing a protective coating around the quartz optical fiber does not allow ultra violet light to penetrate, so that the resin was removed in parts to expose the quartz.

Figure 10:
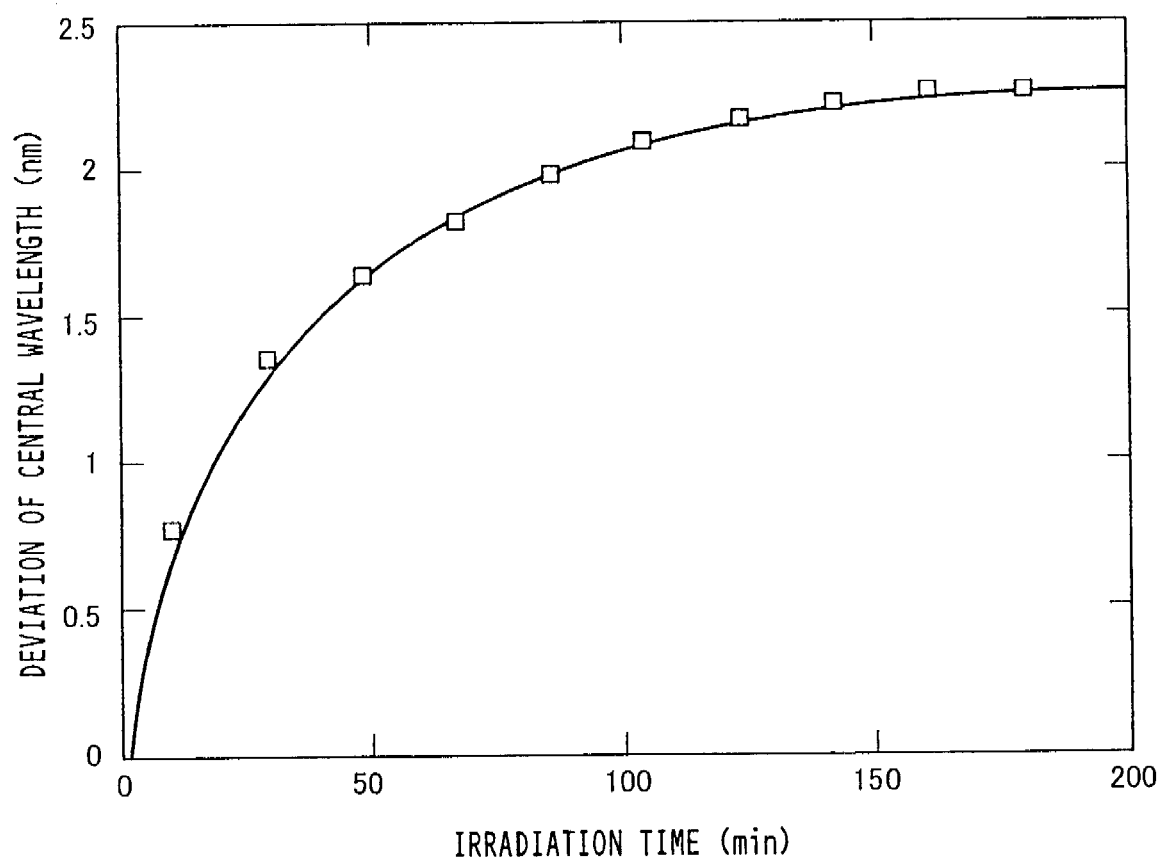
FIG. 10 shows the transition of central wavelength due to irradiation of UV light by an excimer lamp.

After the exposed quartz parts were irradiated for a fixed duration with ultra violet light from an excimer lamp having power density of 15 mW/cm$^2$, hydrogen removal processing was performed for 12 hours at 120° C. The wavelength radiated from the excimer lamp was 172 nm. Thereafter, using the phase mask method, a FBG with a reflection central wavelength of 1550 nm was formed on the lamp irradiated portions using the second harmonic (wavelength 244 nm) from an argon ion laser. At this time a uniform mask having equal periodicity was used for the phase mask such that each period of the periodicity of the FBG was equal. The length of the FBG region was 3 mm. The results obtained by measuring the changes of the central wavelength of the FBG are shown in FIG. 10. The horizontal axis in FIG. 10 shows time duration of exposure to the excimer lamp and the vertical axis, the degree of change in central wavelength of the FBG, taking the properties of the FBG without exposure to an excimer lamp as the base of measurement.

As shown in FIG. 10, as the length of time of exposure to the excimer lamp increases the refractive index rises, and notwithstanding the fact that the periodicity of the FBG is constant, changes in the central wavelength were confirmed. This relationship between the time duration of radiation exposure and changes in central wavelength sits very well above a plain curved line, and as there is a one-to-one relationship between change in refractive index and duration of radiation exposure, the desired change in refractive index can be obtained simply by controlling this time of exposure, thereby confirming that it is possible to create a grating having the desired central wavelength.

The difference between refractive index when non-interfering UV lamp light (excimer lamp light) is radiated to one side of an optical waveguide and radiated to multiple faces of an optical waveguide will be considered.

Figure 17A:
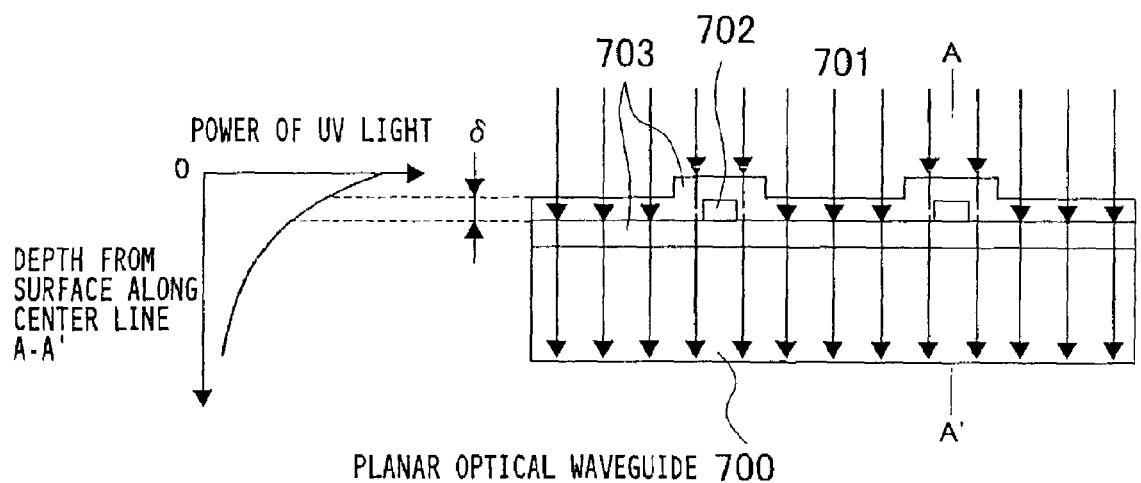
FIG. 17A shows UV distribution amplitude in a planar optical waveguide.

FIG. 17A shows a core 702 and a cladding 703 disposed on a planar optical waveguide substrate 700. Due to the structure of the planar optical waveguide the face of the radiation is restricted to one side of the structure. That is to say, the side and lower faces of the optical waveguide are a thick substrate, such that irradiation of the optical waveguide from the surrounding area other than from the upper surface is difficult. Accordingly there is a substantial difference 6 of the light amplitude in the inside and the upper surface of the optical waveguide close to the lamp light 701, thus, it can be estimated that the double refraction increases.

Figure 17B:
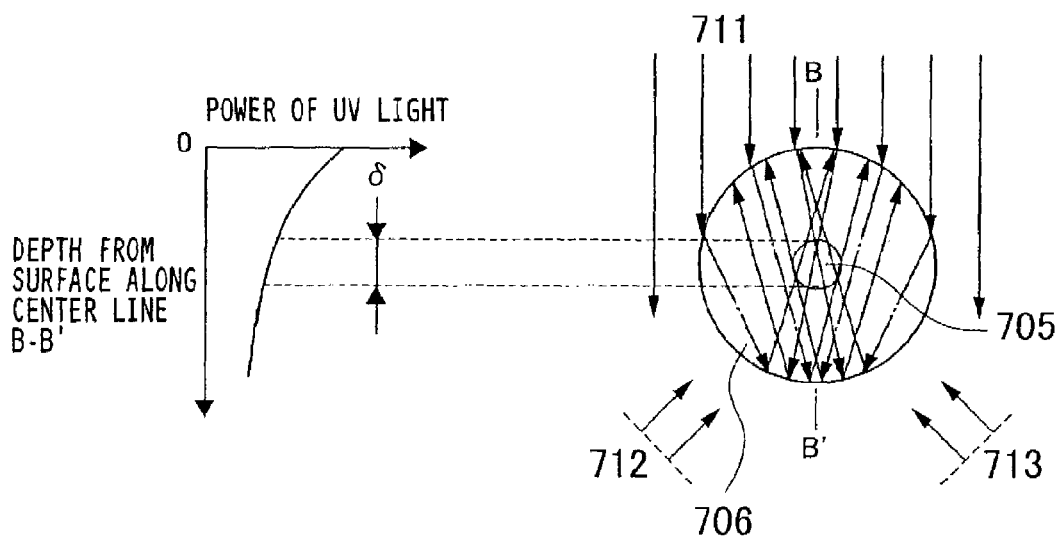
FIG. 17B shows UV distribution amplitude in an optical fiber.

On the other hand, in the case illustrated in FIG. 17B radiated light easily reaches from all around the optical waveguide and even if for example, UV lamp 711 irradiates only one side of the optical waveguide, the core 705 can still be irradiated due to the reflection and dispersal of the UV light 712 and 713 occurring within the optical fiber and coming from the material surrounding the fiber. Accordingly as the difference δ of the light amplitude in the inside and the upper surface of the optical waveguide close to the lamp light is relatively small, it can be estimated that the double refraction is small. Further, as the supplementary UV light 712 and 713 is radiated from around the optical fiber, double refraction is lowered further.

Figure 18:
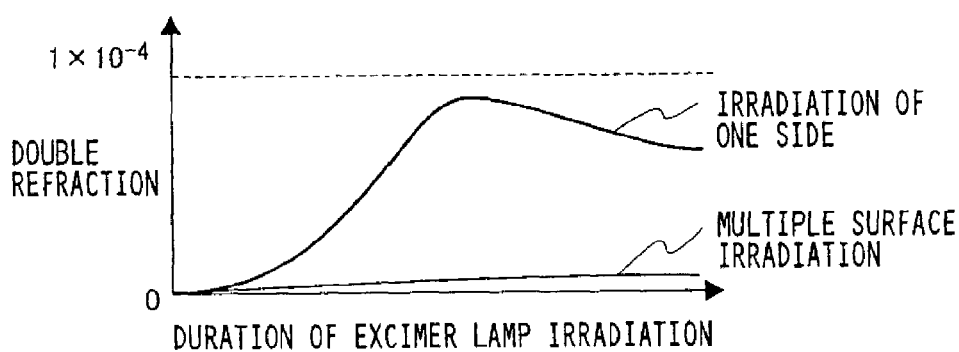
FIG. 18 illustrates the increase in the birefringence of an optical fiber due to irradiation from an excimer lamp.

FIG. 18 illustrates the relationship of double refraction and duration of radiation time when UV lamp light irradiated one side of the optical fiber and multiple faces of the optical fiber. The duration of radiation from the excimer lamp is plotted on the horizontal axis in that figure and values for double refraction are plotted on the vertical axis.

FIGS. 19A-19E depict methods for realizing the above-described irradiation of different aspects of an optical waveguide with UV lamp light.

Figure 19A:
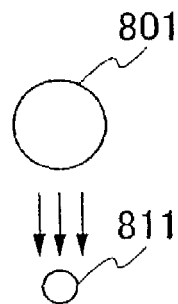
FIG. 19A shows an example of irradiation of one side of an optical fiber with light from UV lamp.
Figure 19B:
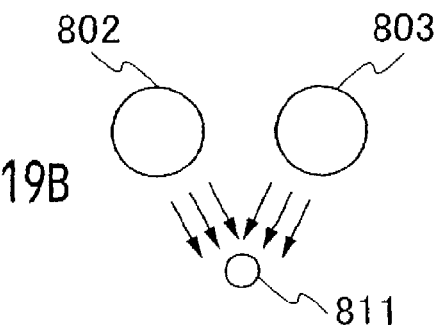
FIG. 19B shows an example of irradiation of both sides of an optical fiber with light from UV lamps.
Figure 19C:
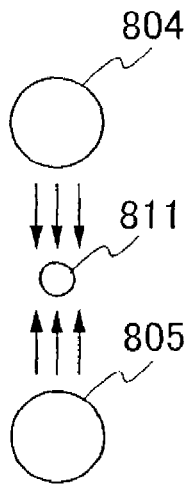
FIG. 19C shows an example of irradiation of both sides of an optical fiber with light from a UV lamps.
Figure 19D:
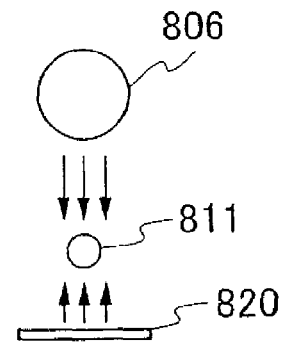
FIG. 19D shows an example of irradiation of multiple faces of an optical fiber with light from a UV lamp where a reflector plate is used.
Figure 19E:
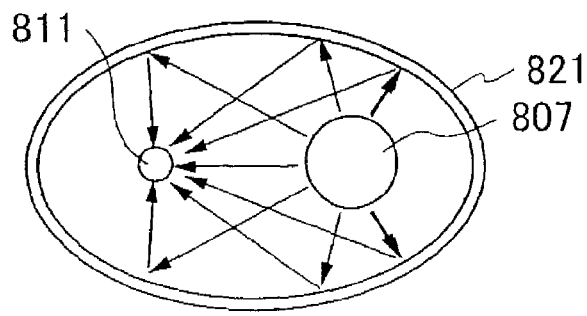
FIG. 19E shows an example of irradiation of multiple faces of an optical fiber with light from a UV lamp where a curved reflector plate is used.

FIG. 19A illustrates the case where UV lamp light 801 irradiates optical fiber 811 from one side. FIGS. 19B to 19E illustrate radiation of UV lamp light to multiple faces of the optical waveguide. In FIG. 19B, the case of having two lamps 802 and 803 juxtaposed, irradiating both sides of optical fiber 811 is illustrated. FIG. 19C shows the case where two excimer lamps 804 and 805 are arranged on opposite sides of optical fiber 811, so as to radiate to both sides thereof. FIG. 19D shows a reflection plate 820 disposed opposing excimer lamp 806, such that as light radiated from the single excimer lamp is reflected and dispersed from this plate, the optical fiber 811 is irradiated with light from multiple directions. Finally, FIG. 19E illustrates that the shape cross-sectionally of a curved reflection plate 821 may be elliptical. Further, the reflection plate may be an ellipsoid having the optical fiber 811 and the excimer lamp 807 disposed respectively in two different focal points therein.

The maximum value of double refraction of an FBG formed according to the above method is, in the case of irradiation from one side, $0.7 \times 10^{-4}$. Further, it was confirmed that double refraction can be below $0.1 \times 10^{-4}$ where radiation from the excimer lamp is directed to multiple surfaces of the optical waveguide. Accordingly, polarization dependent loss (PDL) and polarization mode dispersion (PMD) arising due to double refraction can be reduced.

Second Embodiment

Figure 11A:
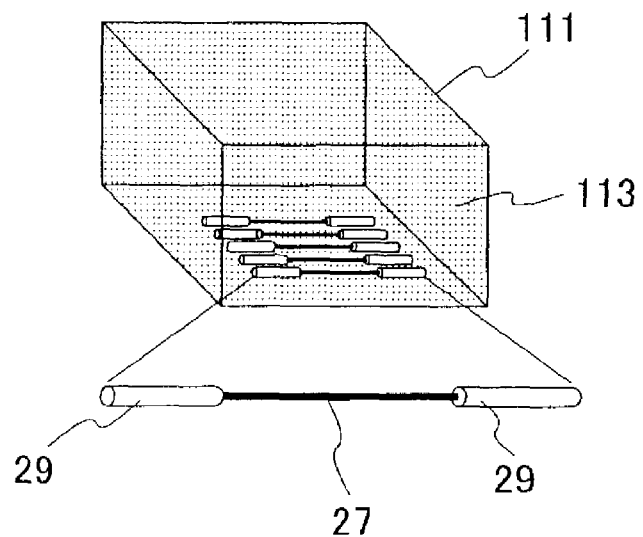
FIG. 11A illustrates process 1 related to the second embodiment of the present invention.

FIGS. 11 and 12 illustrate a method for producing a grating-type optical component related to the second embodiment of the present invention. As step 1 of FIG. 11A is the same as step 1 of the first embodiment depicted in FIG. 3A a description of step 1 of FIG. 11A is omitted here.

Figure 11B:
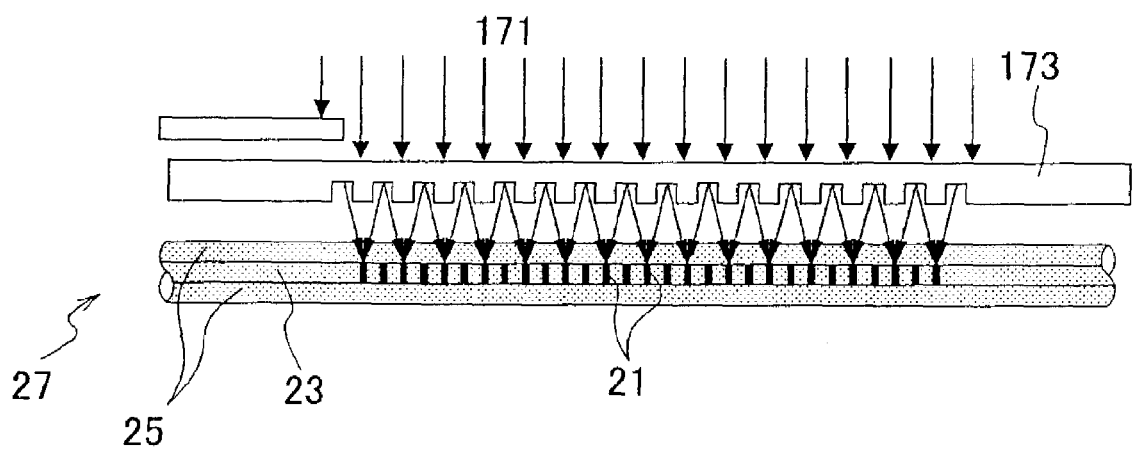
FIG. 11B illustrates process 2 related to the second embodiment of the present invention.

As shown in FIG. 11B, in step 2 of this embodiment interfering UV laser light 171 is radiated, via phase mask 173, to optical fiber 27 to form FBG 21 with hydrogen diffused on the optical waveguide core part 23.

According to this second embodiment, the optical fiber is single mode having a specific refractive index difference of 0.35%, with approximately 3.5 Wt % $GeO_2$ added, the core diameter being approximately 10 μm.

Figure 12A:
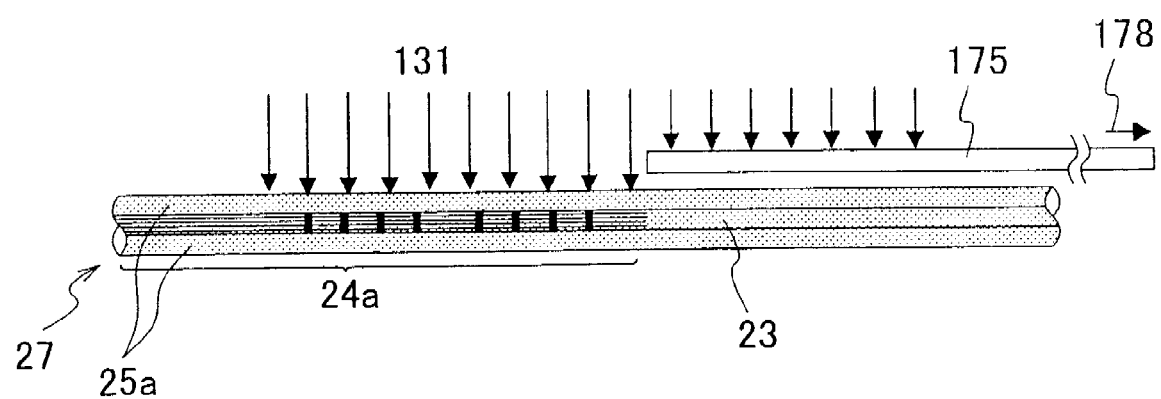
FIG. 12A illustrates process 3 related to the second embodiment of the present invention.
Figure 12B:
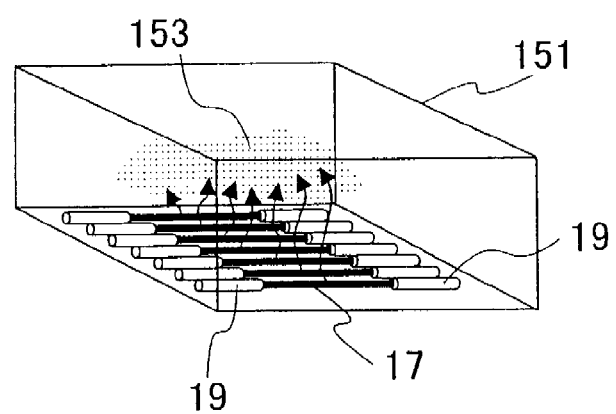
FIG. 12B illustrates process 4 related to the second embodiment of the present invention.

Descriptions of step 3 of the second embodiment shown in FIG. 12A and of step 4 of that embodiment shown in FIG. 12B are omitted here, those steps being the same respectively as step 2 of the first embodiment shown in FIG. 3B and step 3 of the first embodiment shown in FIG. 4A.

Figure 13:
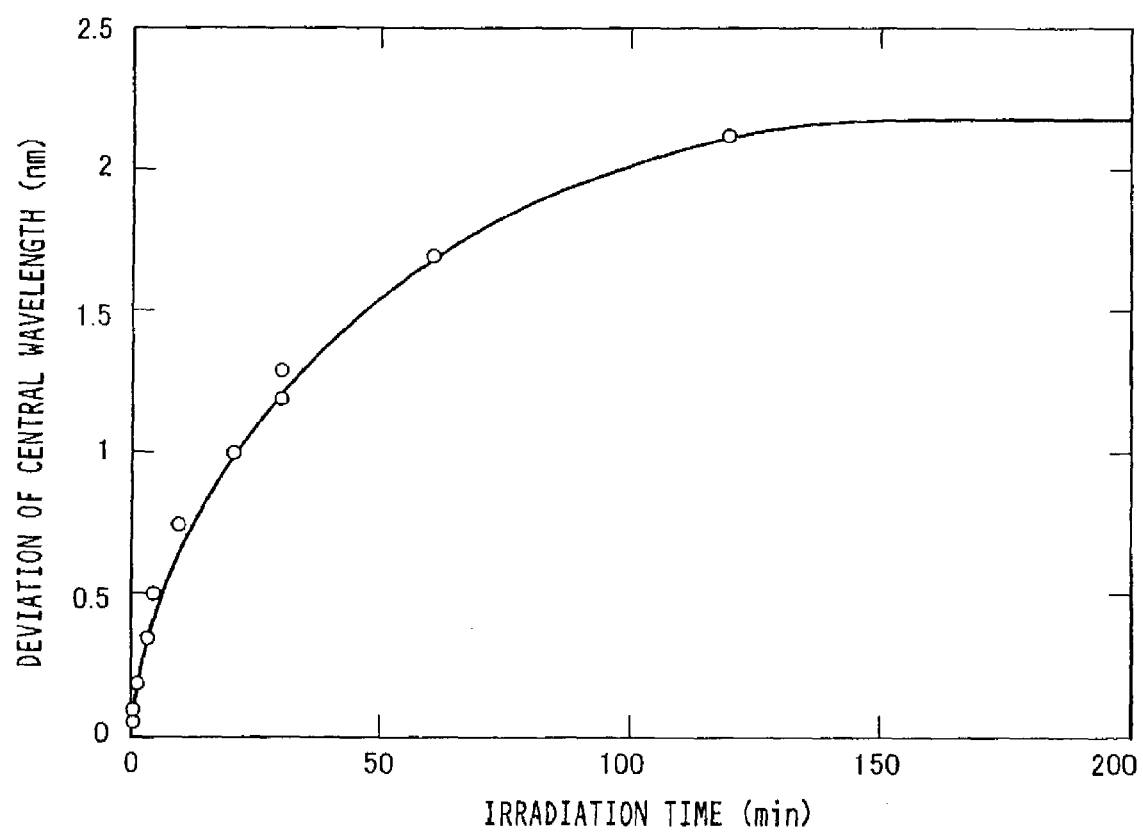
FIG. 13 shows the transition of central wavelength in an optical fiber grating after irradiation of UV light by an excimer lamp using a method according to the second embodiment.

According to this second embodiment, the order of irradiation using the excimer lamp and the laser light to form an FBG, performed under the same conditions as described with respect to the first embodiment, was changed. Moreover, removal of the hydrogen was performed as the last step. That is to say, the steps hydrogen diffusion, irradiation with laser light, irradiation from an excimer lamp and hydrogen removal were performed in that order and changes in the central wavelength of the laser light were confirmed. The results are shown in FIG. 13. It was evident that changes in the central wavelength of reflected light from the FBG were the same as those apparent in the case of the first embodiment even where irradiation with the excimer lamp was performed at this stage among the order of the steps, thus confirming that the results for central wavelength of reflected light from the FBG changes were the same regardless of the order in which the excimer lamp irradiation and FBG formation steps were performed.

The maximum value of double refraction of an FBG created according to the above method is, in the case of radiation with an excimer lamp from one side, $0.7 \times 10^{-4}$. Further, in the same manner as applied with respect to the first embodiment it was confirmed that double refraction can be below $0.1 \times 10^{-4}$ where radiation from the excimer lamp is directed to multiple surfaces of the optical waveguide. Because these values are the same as those obtained using the FBG formed in accordance with the method of the first embodiment, it was confirmed that the same results were obtained with respect to the properties of double refraction regardless of whether the excimer lamp irradiation step or the FBG formation step is performed first. Accordingly, PDL and PMD arising due to double refraction can be reduced.

Third Embodiment

A production method for a grating-type optical component related to a third embodiment of the present invention will now be described. According to this third embodiment, an experimental single mode optical fiber having a specific refractive index difference of 0.85%, with approximately 8.5 Wt % $GeO_2$ added and a core diameter of approximately 4 μm was produced.

In step 1, this optical fiber was placed in a 55° C., 10 MPa hydrogen atmosphere and left there for one week to allow the hydrogen to penetrate through to the core of the optical fiber. The UV-curable resin, providing a protective coating around the quartz optical fiber, does not allow ultra violet light to penetrate, so this was removed in parts to expose the quartz.

At step 2, non-interfering UV lamp light 131 was uniformly radiated over the entire optical fiber as shown in FIG. 12A, raising the refractive index as shown in FIG. 5A. However, at this step a amplitude mask was not used. Further, the amplitude of the UV lamp light providing the light source was 10 mW/cm$^2$.

At step 3, after the exposed quartz parts were irradiated for a fixed duration with ultra violet light from an excimer lamp having power density of 10 mW/cm$^2$, hydrogen removal processing was performed for 12 hours at 120° C. The wavelength radiated from the excimer lamp was 172 nm. Thereafter, using the phase mask method, a reflection central wavelength 1550 nm FBG was formed on the lamp irradiated portions using the second harmonic (wavelength 244 nm) from an argon ion laser. At this time a uniform mask having equal periodicity was used for the phase mask such that each period of the periodicity of the FBG was equal. The length of the FBG region was 3 mm.

Figure 14:
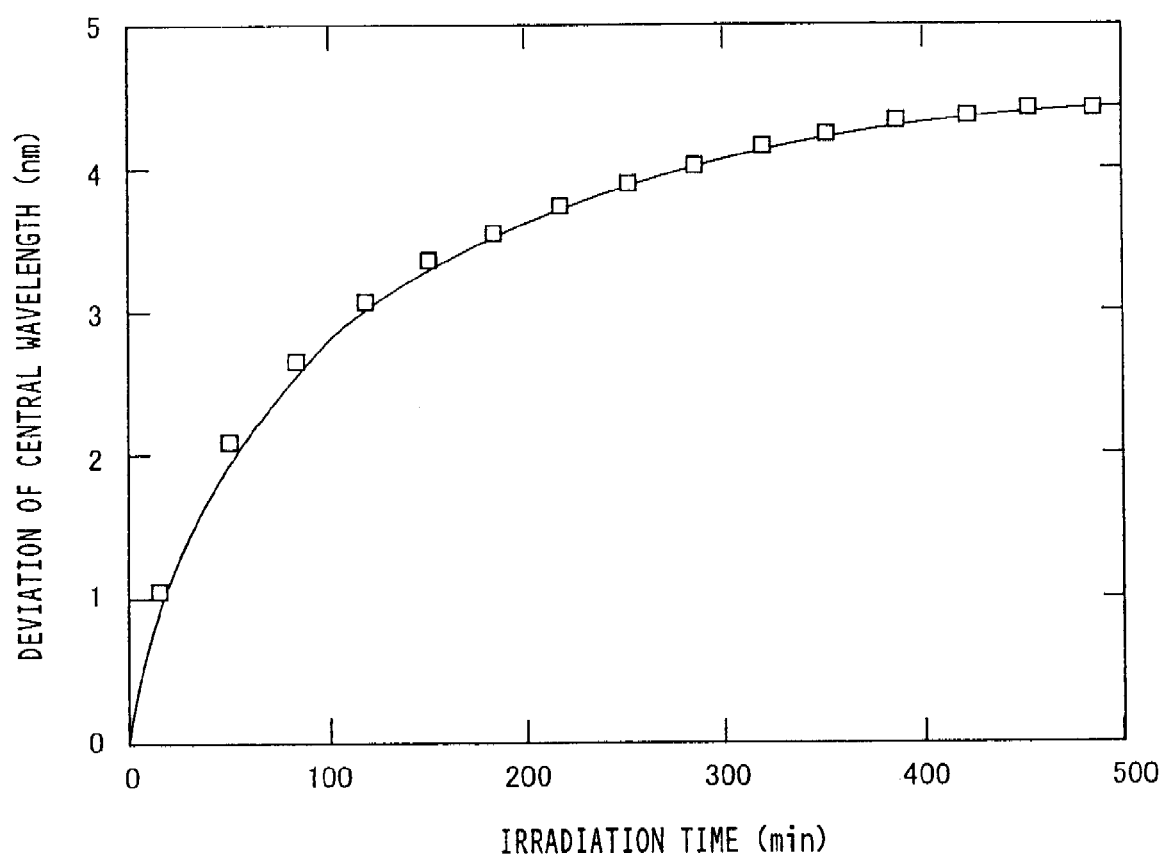
FIG. 14 shows the transition of central wavelength due to irradiation of UV light by an excimer lamp using a method according to the third embodiment.

FIG. 14 shows the results obtained after the above steps were performed. The horizontal axis in FIG. 14 shows time duration of exposure to the excimer lamp and the vertical axis, the degree of change in central wavelength of the FBG, taking the properties of a sample not exposed to excimer lamp irradiation as the base of measurement. It is apparent that as the length of time of exposure to the excimer lamp increases, the refractive index rises, and notwithstanding the fact that the periodicity of the FBG is constant, changes in the central wavelength were confirmed. This relationship between the time duration of radiation exposure and changes in central wavelength sits very well above a plain curved line, and as there is a one-to-one relationship between change in refractive index and duration of radiation exposure, the desired change in refractive index can be obtained simply by controlling this time of exposure, thereby confirming that it is possible to form a grating having the desired central wavelength.

The trend of increase in the degree of change in central wavelength (a curve shaped line) is largely the same in comparison to the results obtained with respect to the first embodiment. However, the absolute values for exposure time to the light and central wavelength change are different. This is because the amount of added photosensitive material (here, Ge) as well as the structure of the optical fiber were different and also because the respective amplitudes of the excimer lamp radiation were different.

Generally, the speed of change in refractive index increases as the amplitude of light radiated from an excimer lamp increases and the maximum degree and speed of change in refractive index increases in line with the amount of photosensitive material added. As shown with respect to the first and second embodiments however, even where the amount of photosensitive material added and the optical fiber structures differ, a relationship of the power of excimer lamp radiation and the degree of central wavelength change, in other words, refractive index change, exhibits a relationship conforming to the same curve shaped line. That is to say, even where the amplitude of excimer lamp radiation or the amount of added photosensitive material are changed, it is possible for the desired properties to be easily obtained from the relationship between radiation time and refractive index change in accordance with those conditions. Further, those desired properties can be readily obtained in a short time by setting the appropriate structure for the optical fiber, such as the amount of added photosensitive material, and amplitude of excimer lamp radiation.

The maximum value for double refraction of an FBG created according to the above method is $0.8 \times 10^{-4}$ when only one side of the optical fiber is exposed to excimer lamp radiation. Further, double refraction can be brought below $0.1 \times 10^{-4}$ by irradiating multiple surfaces of the optical fiber using the excimer lamp as described. Accordingly PDL and PMD arising due to double refraction can be reduced.

After the above described step 3 of this third embodiment, step 4 for hydrogen removal is performed; however, this step 4 is the same as the step 4 of the second embodiment of this invention shown in FIG. 12B. Therefore, a description of this step 4 is omitted here.

Fourth Embodiment

A production method for a grating-type optical component according to a fourth embodiment of the present invention will now be described. Step 1 of this fourth embodiment is the same has step 1 of the first embodiment shown in FIG. 3A therefore a description of this step one is omitted here.

As shown in FIG. 6C, at step 2 of this fourth embodiment the duration of blocking non-interfering UV lamp light 131 was successively altered by moving the amplitude mask 175 at a predetermined speed, thereby changing the duration of exposure to light of the optical fiber core. As shown in FIG. 6C, a sloping line was obtained for refractive index under these conditions. Further, a single periodicity phase mask was used producing a substantially chirped FBG. The length of the change in refractive index represented by this refractive index sloping line, that is a length of the entire length of the FBG, was 100 mm.

The experimental optical fiber used for this fourth embodiment was a single mode optical fiber having a specific refractive index difference of 0.35%, with approximately 3.5 Wt % GeO$_2$ added and a core diameter of approximately 10 μm. A light source having UV lamp light of a power of 15 mW/cm$^2$ was used.

For this embodiment the required exposure time to UV light in a lengthwise direction of the optical fiber was obtained as a linear function of a position in a lengthwise direction of the optical fiber at an accuracy confining wavelength deviation to a range of 2 nm at the location of the maximum and 0 nm at the location of the minimum, based on the results of a second embodiment. Further, based on these results the desired movement of the amplitude mask 175 was obtained and for step 2, the amplitude mask 175 was moved based on those results.

At step 3, hydrogen was removed from the optical fiber. This step of the process employed here was the same as that employed in step 3 of the first embodiment as shown in FIG. 4A therefore a description of this step is omitted here.

Figure 15A:
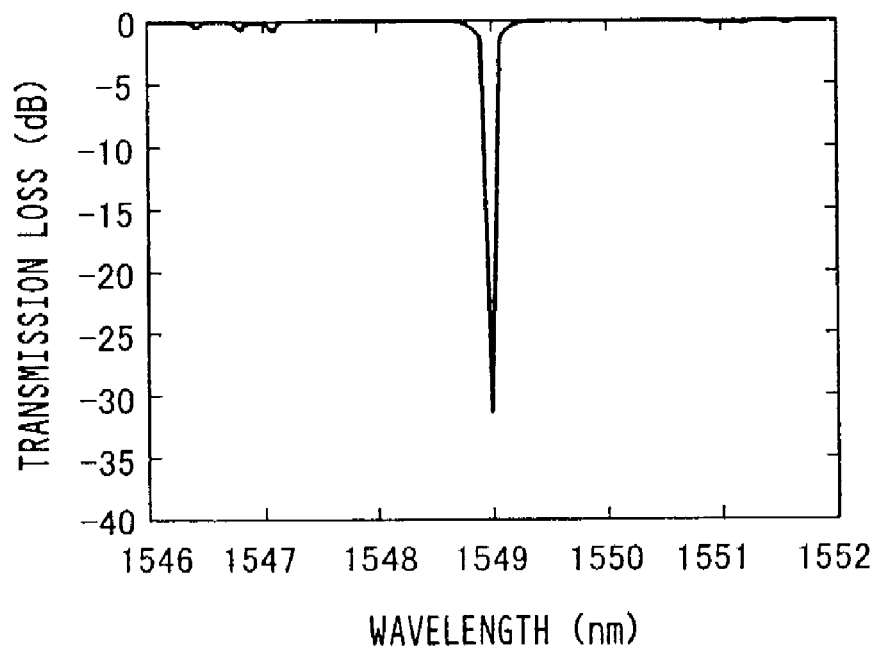
FIG. 15A shows characteristics of transmission loss when irradiation of UV light by an excimer lamp is not performed.
Figure 15B:
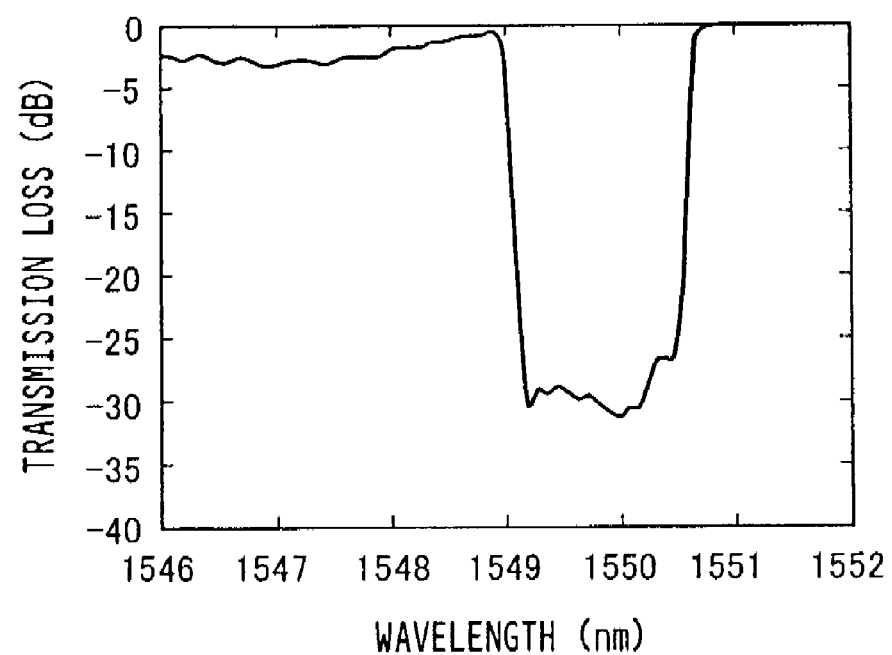
FIG. 15B shows characteristics of transmission loss when irradiation of UV light by an excimer lamp is performed.

Thereafter, at step 4, in the region for refractive index change, a 100 mm FBG was formed by exposure to light using the phase mask method using a uniform mask. The laser used for this light exposure was an argon ion laser radiating light of the second harmonic (wavelength 244 nm). FIG. 15B shows the characteristics of transmission loss of the FBG obtained by this process. FIG. 15A shows the transmission spectral after exposure to the same light without irradiation with an excimer lamp being performed. As is apparent from FIG. 15B, it was confirmed that radiation with the excimer lamp enables formation of an FBG having a broad band, and even where a uniform mask is used a substantially chirped FBG can be formed. This kind of chirped FBG can be applied for a chromatic dispersion compensator or the like.

The refractive index of the FBG formed in this way was $0.3 \times 10^{-4}$ when one side of the optical fiber was exposed to the radiation using the excimer lamp. Further, it was confirmed that double refraction can be below $0.1 \times 10^{-4}$ where radiation from the excimer lamp is directed to multiple surfaces of the optical fiber. Accordingly, PDL and PMD arising due to double refraction can be reduced.

Figure 16A:
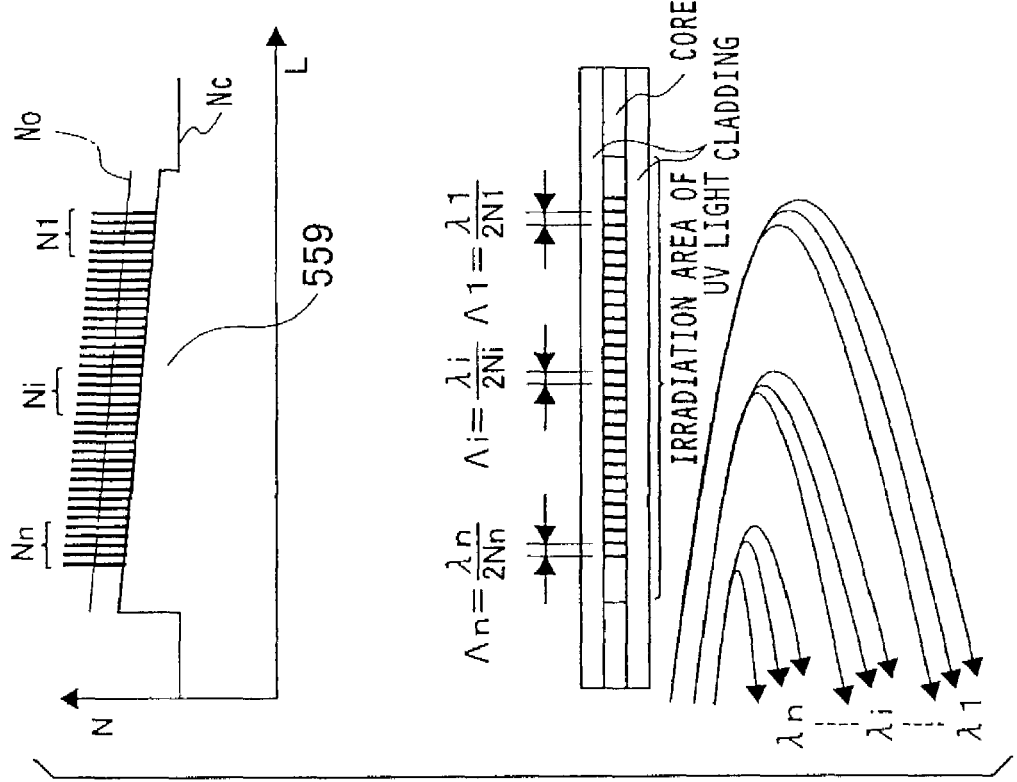
FIG. 16A shows the properties of a chirped type FBG formed using a method of the prior art.
Figure 16B:
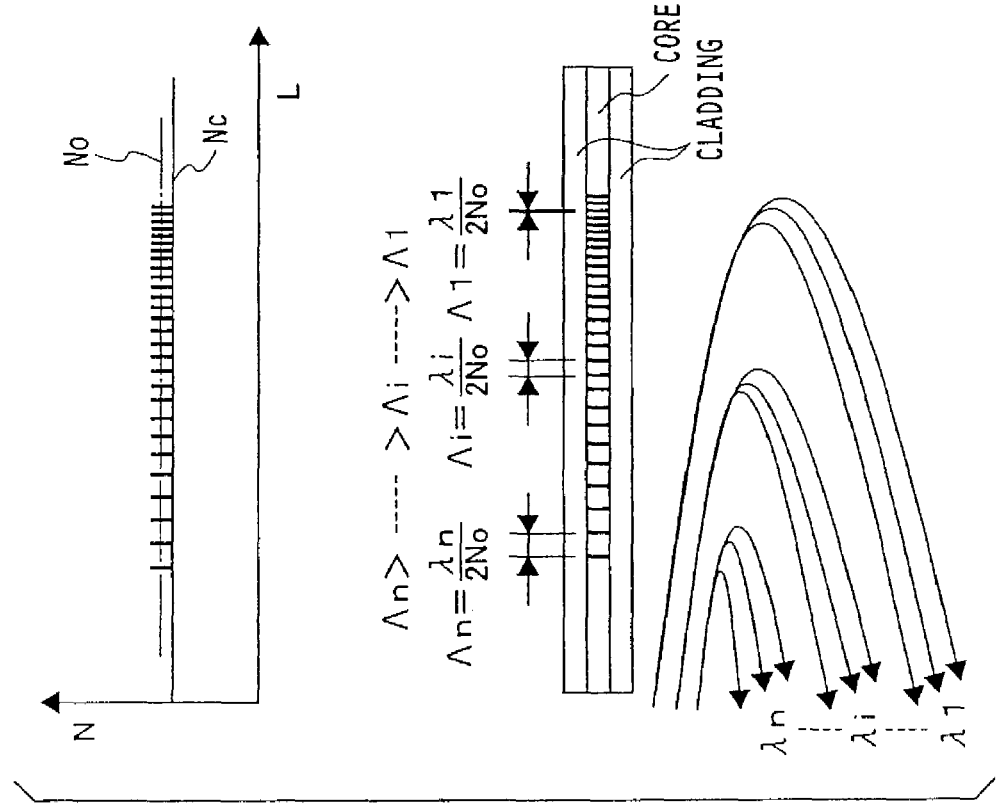
FIG. 16B shows the properties of a chirped type FBG formed using a method according to the present invention.

The FBG produced for this experiment using a uniform type phase mask having single periodicity has the reflection properties illustrated in FIG. 16B. In portions of the FBG of substantial refractive index change through exposure to UV light irradiation was largest, reflection central wavelength $\lambda_n$ was longest, as the refractive index becomes successively, gradually lower, the reflection central wavelength also becomes shorter in proportion thereto, such that in the FBG portions at the lowest point of the sloping line indicating refractive index the lowest value for reflection central wavelength is $\lambda_1$. As shown in FIG. 16A, this is the same result as a chirped type FBG having successively altered FBG pitch using methods of the prior art.

As can be seen from the description of the above embodiments, it is irrelevant whether the step for changing refractive index using UV light irradiated from a non-interfering light source or the step for creating the FBG using exposure to interfering light is performed first.

Control Systems

Control systems for the present invention are used for controlling operations as the refractive index of an optical fiber is altered.

These control systems can be classified as refractive index adjustment methods as shown in FIGS. 5A and 6B. That is to say, a method that does not use the amplitude mask or a method in which the amplitude mask is not moved by using a fixed type amplitude mask having a plurality of slits of different widths, or an adjustment method as shown in FIG. 6C that involves moving the amplitude mask.

First Control System

Figure 23A:
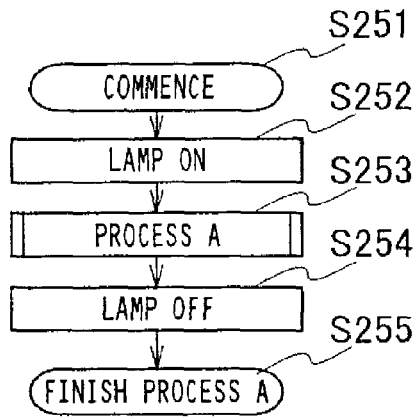
FIG. 23A shows the main flow when altering the refractive index of an optical fiber without using an amplitude mask.

FIG. 23A is a main flow chart showing operations when an amplitude mask is not used or when the amplitude mask is not moved.

Referring to FIG. 23A, after the control processes commence (S251) firstly the excimer lamp comes on (S252) and control process A for adjusting refractive index is performed (S253). When that step is completed the excimer lamp goes off (S254) and the series of processes is complete (S255). As the details of the process A differs in accordance with the structure of the control system, these are described following.

Figure 20:
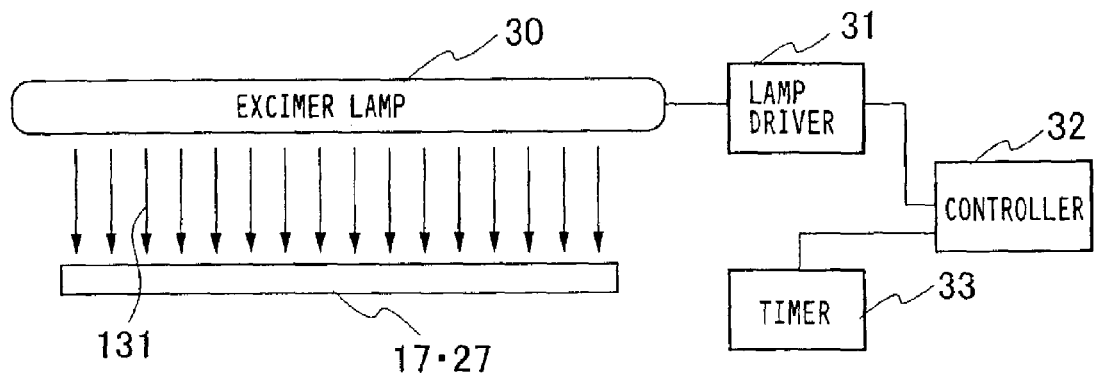
FIG. 20 shows the control system (using a timer) used when altering the refractive index of an optical fiber without moving an amplitude mask.

FIG. 20 provides an example of a control system in which an amplitude mask is not used or in which an amplitude mask is not moved for the adjusting of refractive index.

This control system comprises an optical fiber 17 or 27, a lamp driver part 31 for radiating non-interfering UV lamp light 131 from an excimer lamp 30, a control part 32 for controlling the on/off conditions of the excimer lamp 30 and a timer 33 that operates as a determining means for determining the degree of refractive index change.

When this control system is utilized, the required duration of irradiation time in order to obtain the desired refractive index is first estimated, and once the time elapsed from commencement of irradiation of the light is detected, by the timer 33, as having exceeded the set duration of irradiation time, radiation of the light is stopped by the control part 32.

Figure 23B:
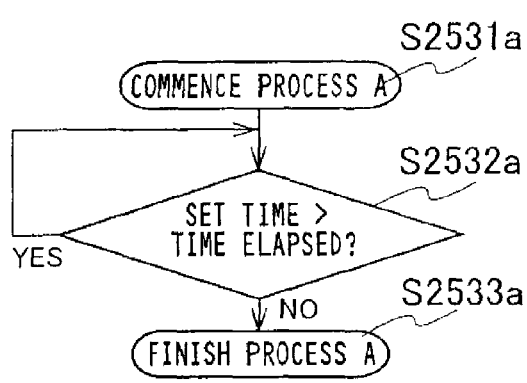
FIG. 23B shows the flow of processing of the control system of FIG. 20.

FIG. 23B is a flow chart depicting process A of the above control system. As shown in FIG. 23B, as lighting of the excimer lamp 30 is confirmed, operation of a clock commences from the timer 33 (S2531$a$) and once the duration of time elapsed exceeds the set duration of radiation time (S2532$a$: No), the process is completed (S 2533$a$) and the excimer lamp 30 stops lighting (S254).

Figure 21:
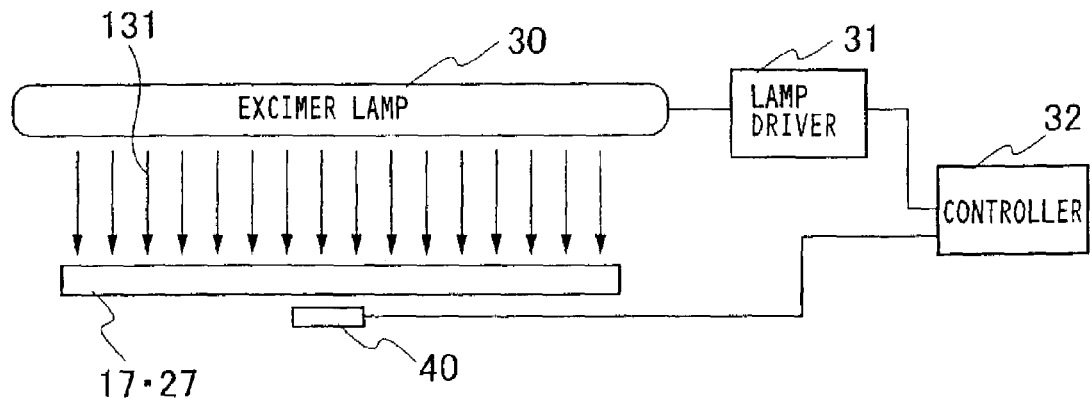
FIG. 21 shows the control system (using an optical power meter) used when altering the refractive index of an optical fiber without moving an amplitude mask.

Further, the structure of this kind of control system may be a structure having an optical power meter as shown in FIG. 21. When this kind of control system is used the required power of irradiation (the integrated power of irradiated light) in order to obtain the desired refractive index is first estimated and once the estimated power of light from commencement of radiation of the light is detected, by the optical power meter 40, as having reached the power of light set, radiation of the light is stopped by the control part 32.

Figure 23C:
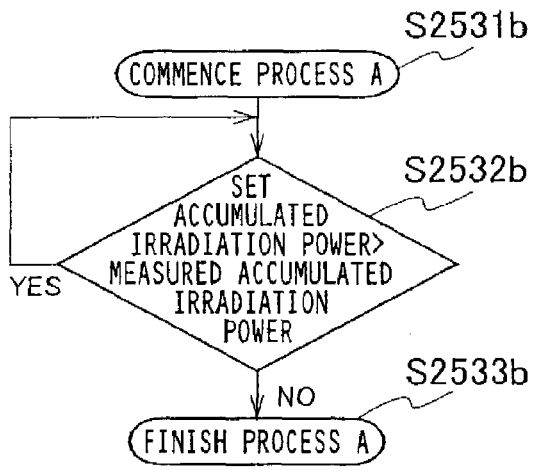
FIG. 23C shows the flow of processing of the control system of FIG. 21.

FIG. 23C is a flow chart depicting process A of the above control system. As shown in that FIG. 23C, as lighting of the excimer lamp 30 is confirmed, measurement of light by an optical power meter 40 commences (S2531$b$) and once the power of light irradiated exceeds the set estimated power (S2532$b$: No), the process is completed (S2533$b$) and the excimer lamp 30 stops lighting (S254).

Figure 22:
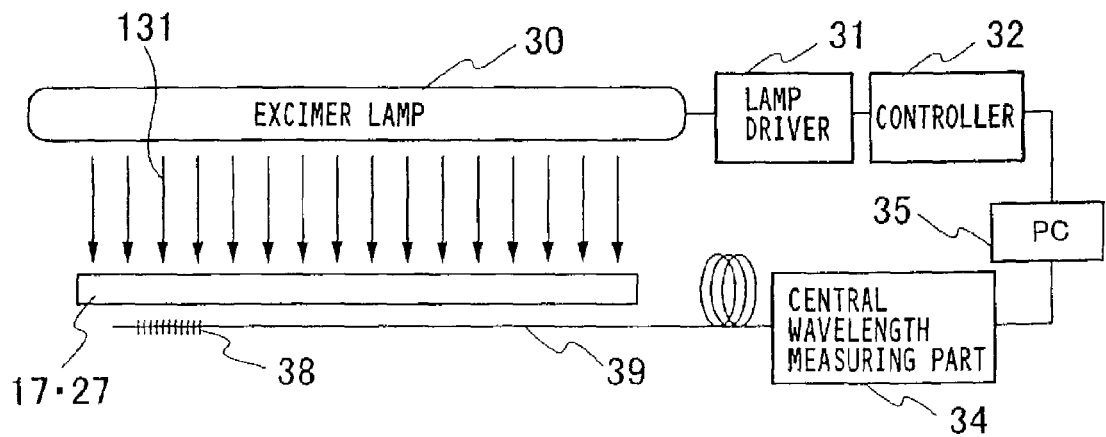
FIG. 22 shows the control system (using an FBG) used when altering the refractive index of an optical fiber without moving an amplitude mask.

A control system may be of a structure having a measuring part for central wavelength measurement of reflected light from an optical fiber grating or the like. This kind of control system is shown in FIG. 22.

An optical fiber grating 38 for a central wavelength detector is formed on an optical fiber 39. This optical fiber 39 can be an optical fiber which has the same photosensitivity as the optical fiber 17, 27 or an optical fiber the degree of change of the refractive index is known. The central wavelength measurement part 34 measures the change of central wavelength of reflected light from the optical fiber grating due to the radiated UV lamp light 131.

With this structure of control system, radiation of the UV light can be stopped at the point in time at which the desired refractive index change is achieved because the change of refractive index in the optical fiber 17 or the optical fiber 27 can be estimated in real-time from the change of central wavelength arising as the light is radiated to the optical fiber grating 38.

Further, a structure can also be configured in which the degree of change of central wavelength indicating the desired change in refractive index is set in advance and radiation of the light is stopped when this degree of change in central wavelength is reached. A process flow chart for this kind of system is shown in FIG. 23D.

Figure 23D:
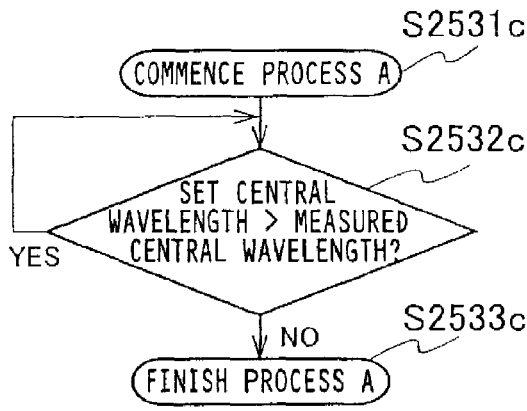
FIG. 23D shows the flow of processing of the control system of FIG. 22.

As shown in FIG. 23D, as lighting of the excimer lamp 30 is confirmed, central wavelength measurement commences from a central wavelength measurement part 34 (S2531$c$), and once the degree of measured central wavelength change, exceeds the set degree of wavelength change (S2532$c$: No), the process is completed (S2533$c$) and the excimer lamp 30 stops lighting (S254).

Second Control System

Figure 24:
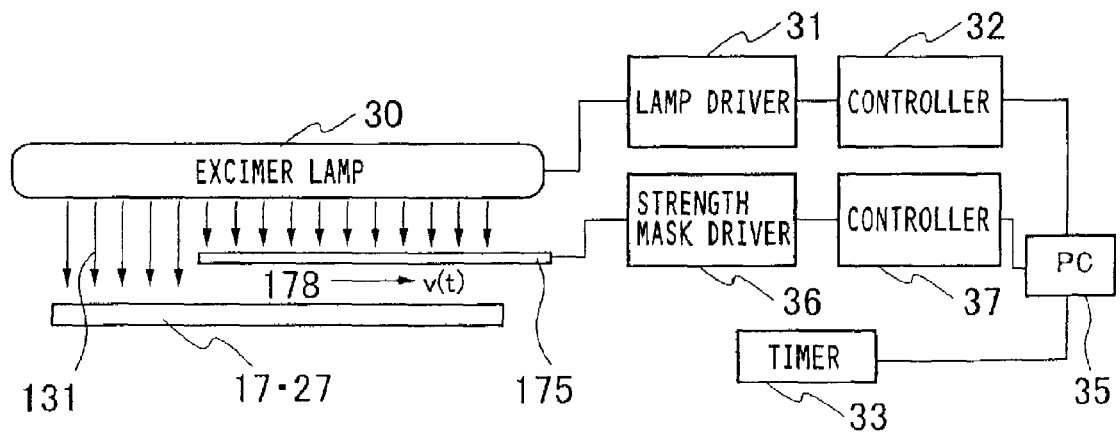
FIG. 24 shows the control system having a timer used when altering the refractive index of an optical fiber by moving an amplitude mask.

FIG. 24 shows an example of a control system for adjusting/tailoring refractive index profiles when a amplitude mask is moved (178) or when the amplitude mask is not moved.

This control system has, added to the system of FIG. 20, an amplitude mask driver part 36 for driving the amplitude mask, a control part 37 for controlling the amplitude mask driver part 36 and a personal computer (PC) 35, while the functions of the other components of the structure are the same as those of the control system described with respect to FIG. 20. The PC 35 receives signals from the timer 33 and operates the control parts 32 and 37 based on those signals.

Figure 28A:
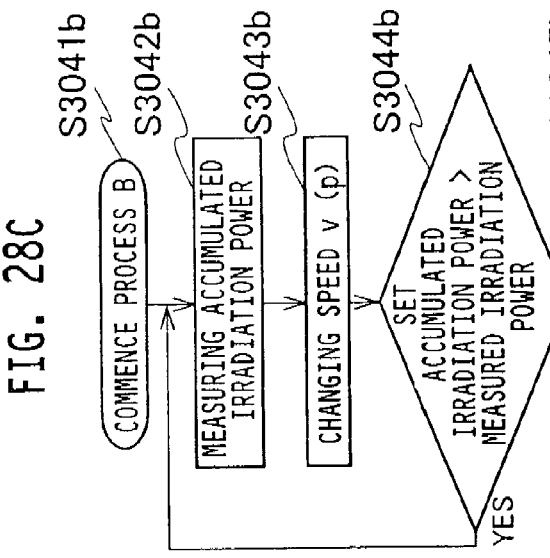
FIG. 28A shows the main flow when altering the refractive index of an optical fiber by moving an amplitude mask.

FIG. 28A is a main flow chart showing the operations of the control system when the amplitude mask is moved. Referring to FIG. 28A, after the control processes commence (S301) firstly the amplitude mask transitions to the starting point (the initial position) as necessary (S302) and once this is confirmed the excimer lamp comes on (S303) and control process B is implemented (S304) for adjusting refractive index. When that step is completed the excimer lamp goes off (S305) and the series of processes is complete (S306). The details of the process B differs in accordance with the structure of the control system.

Figure 28B:
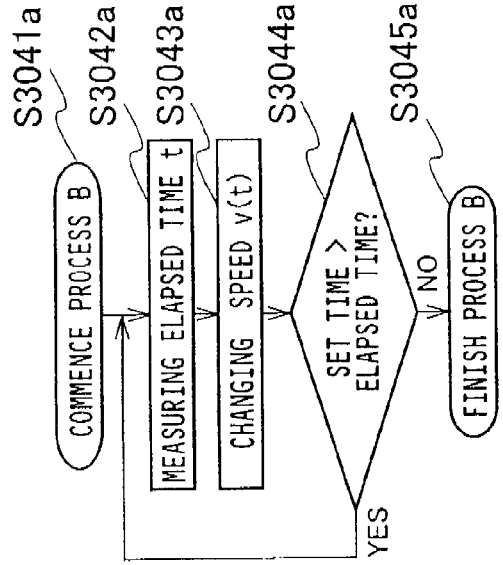
FIG. 28B shows the flow of processing of the control system of FIG. 24.

FIG. 28B is a flow chart depicting process B of the above control system. As shown in FIG. 28B, as lighting of the excimer lamp 30 is confirmed, processes commence (S3041a), operation of a clock commencing from the timer 33 (S3042a) while movement 178 of the amplitude mask 175 commences (S3043a). Where necessary, speed v(t) is changed in accordance with time elapsed, and once the duration of time elapsed exceeds the set duration of irradiation time (S3044a: No), the process is completed (S3045a) and the excimer lamp 30 stops lighting (S305).

Figure 25:
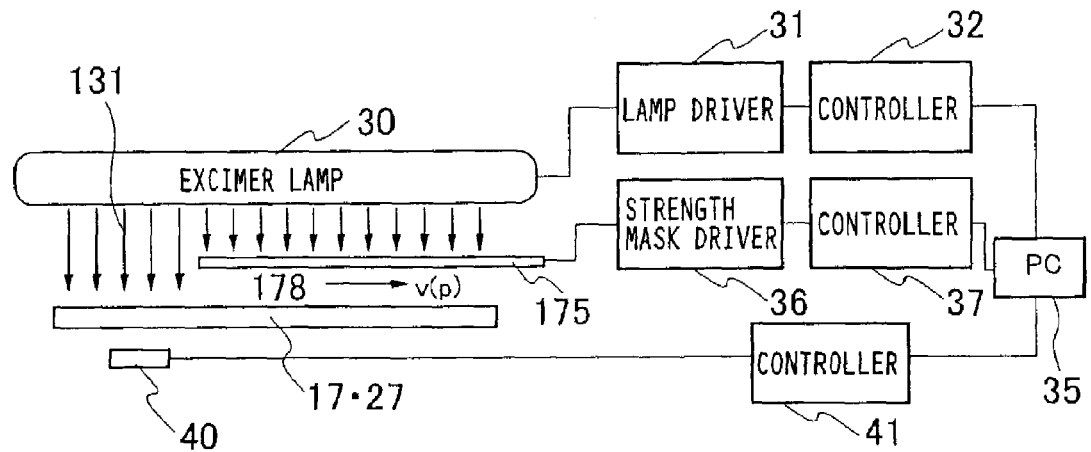
FIG. 25 shows the control system having an optical power meter used when altering the refractive index of an optical fiber by moving an amplitude mask.

FIG. 25 shows a control system in which an optical power meter 40 is installed instead of the timer 33 shown in FIG. 24. A PC 35 receives signals from the optical power meter 40 and operates the control parts 32 and 37 based on these signals; this being the only point of difference between the control system shown in FIG. 25 and the control system shown in FIG. 24 and in all other respects the functions of the components comprising the structure of this control system are the same as those of the control system shown in FIG. 24.

Figure 28C:
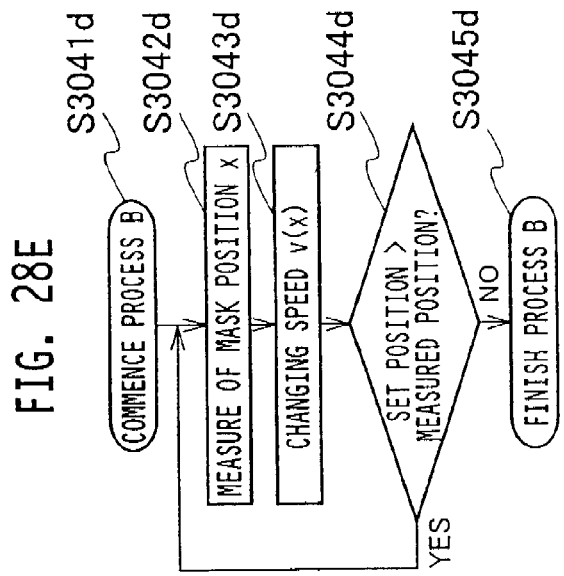
FIG. 28C shows the flow of processing of the control system of FIG. 25.

FIG. 28C is a flow chart depicting process B of the control system shown in FIG. 25. As shown in FIG. 28C, as lighting of the excimer lamp 30 is confirmed, processes commence (S3041b), measurement of light from the optical power meter 40 commences (S3042b) while movement of the amplitude mask 175 begins (S3043b). Where necessary, speed v(t) is changed in accordance with an integrated irradiated power of light, and once the integrated power of light irradiated exceeds the set integrated irradiated power of light (S3044a: No), the process is completed (S3045b) and the excimer lamp 30 stops lighting (S305).

Figure 26:
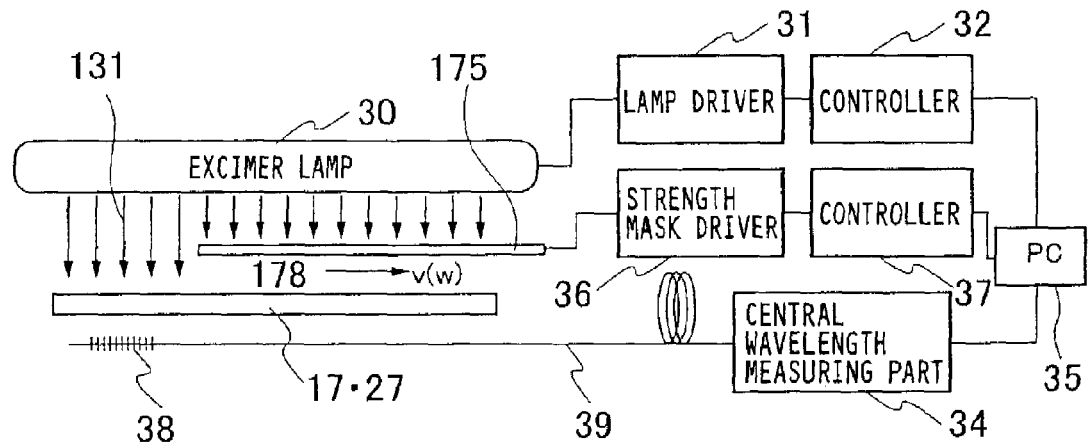
FIG. 26 shows the control system having an FBG used as a sensor when altering the refractive index of an optical fiber by moving an amplitude mask.

FIG. 26 shows a control system in which instead of the optical power meter 40 shown in FIG. 25, an optical fiber 39, optical fiber grating 38 and central wavelength measuring part 34 are installed. A PC 35 receives signals from the central wavelength measuring part 34 and operates the control parts 32 and 37 based on these signals; these being the only points of difference between the control system shown in FIG. 26 and the control system shown in FIG. 25 and in all other respects the functions of the components comprising the structure of this control system are the same as those of the control system shown in FIG. 25.

Figure 28D:
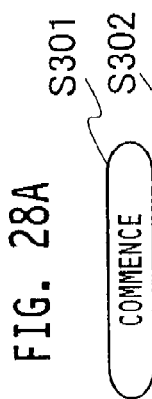
FIG. 28D shows the flow of processing of the control system of FIG. 26.

FIG. 28D is a flow chart depicting process B of the control system shown in FIG. 26. As shown in FIG. 28D, as lighting of the excimer lamp 30 is confirmed, processes commence (S3041c), central wavelength measurement commencing from the central wavelength measurement part 34 (S3042c), while movement of the amplitude mask 175 commences (S3043c). Where necessary, speed v(t) is changed in accordance with central wavelength and once the measured degree of change of central wavelength exceeds the set degree of change of central wavelength (S3044c: No), the process is completed (S3045c) and the excimer lamp 30 stops lighting (S305).

Figure 27:
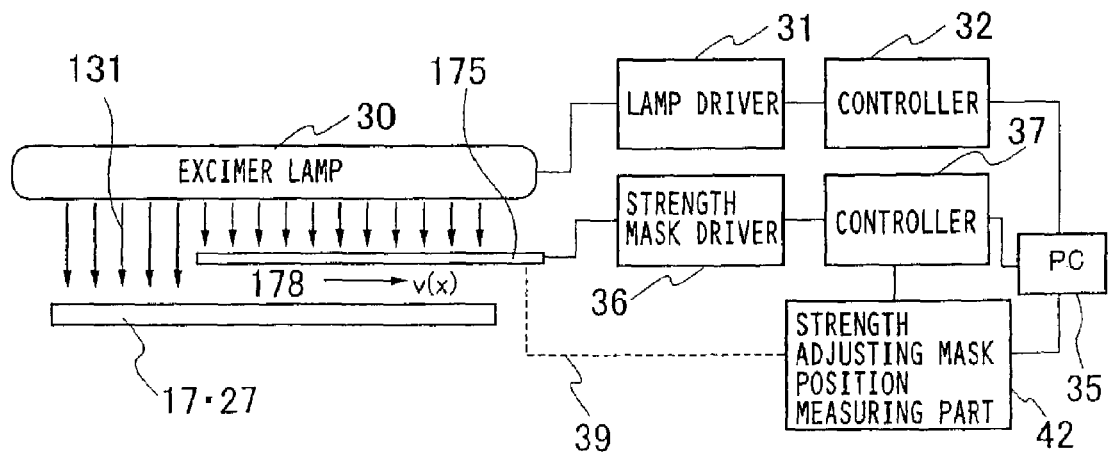
FIG. 27 shows the control system (amplitude mask position measuring part) used when altering the refractive index of an optical fiber by using an amplitude mask.

FIG. 27 shows a control system in which an amplitude mask position measuring part 42 for measuring the position of an amplitude mask 175 is installed instead of the central wavelength measuring part 34 shown in FIG. 26. A PC 35 receives signals from the amplitude mask position measuring part 42 and operates the control parts 32 and 37 based on these signals; these being the only points of difference between the control system shown in FIG. 27 and the control system shown in FIG. 26 and in all other respects the functions of the components comprising the structure of this control system are the same as those of the control system shown in FIG. 26.

Figure 28E:
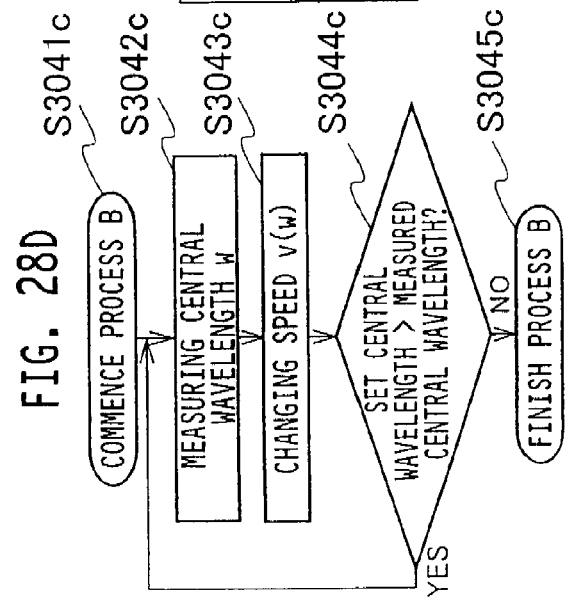
FIG. 28E shows the flow of processing of the control system of FIG. 27.

FIG. 28E is a flow chart depicting the process B of the control system shown in FIG. 27. As shown in FIG. 28E, as lighting of the excimer lamp 30 is confirmed, processes commence (S3041d), measurement of the position of the amplitude mask commencing from the amplitude mask position measuring part 42 (S3042d), while movement of the amplitude mask 175 commences (S3043d). Where necessary, speed v(t) is changed in accordance with the position of the mask and once the mask 175 exceeds the prescribed position for termination of the process (S3044d: No), the process is completed (S3045d) and the excimer lamp 30 stops lighting (S305).

Effects of the Invention

According to the present invention an non-interfering light can be readily altered by changing the refractive index of a silica-based waveguide, enabling a substantial number of various FBG to be economically created using a single phase mask. Further, as non-interfering light of an excimer lamp is used to provide a monochromatic light source, the required light source can be easily obtained.

According to the present invention the desired FBG can be formed by controlling and altering the method of irradiation of the monochromatic light.

This application claims benefit of priority under 35 USC §119 to Japanese Patent Application No. 2003-206061, filed on Aug. 5, 2003, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The invention claimed is:

1. An optical component comprising:
a silica-based optical medium comprising
a first section having a first refractive index, and
a second section having a first periodic refractive index variation combined with a second linear refractive index variation in a longitudinal direction of the optical component,
wherein a smallest refractive index in said second section is equal to or greater than said first refractive index, and
wherein the refractive index of the second section is gradually and continuously increased in a direction of the periodic refractive index variation as a result of the second linear refractive index variation.

2. The optical component of claim 1, wherein said silica-based optical medium is an optical fiber, said second section being a fiber Bragg grating (FBG).

3. An optical component comprising:
a silica-based optical medium comprising a first section having a first refractive index, and second section having a periodic refractive index variation,
wherein a smallest refractive index in said second section is equal to or greater than said first refractive index, wherein a base line level of refractive index of the second section is a gradient which gradually and continuously increases in a direction of the periodic refractive index variation, wherein said silica-based optical medium is an optical fiber, said second section being a fiber Bragg grating (FBG), and wherein a maximum value of double refraction of the FBG is $0.7 \times 10^{-4}$.

4. An optical component comprising:

a silica-based optical medium comprising a first section having a first refractive index, and second section having a periodic refractive index variation, wherein a smallest refractive index in said second section is equal to or greater than said first refractive index, wherein a base line level of refractive index of the second section is a gradient which gradually and continuously increases in a direction of the periodic refractive index variation, wherein said silica-based optical medium is an optical fiber, said second section being a fiber Bragg grating (FBG), and, wherein double refraction of the FBG is below $0.1 \times 10^{-4}$.

5. An optical component prepared by a process comprising the steps of:

providing a silica-based optical waveguide comprising a first section having a first refractive index;

radiating non-interfering monochromatic light of an ultraviolet wavelength region onto a second section of a silica-based optical waveguide diffused with at least one of hydrogen and deuterium so as to gradually and continuously increase a second refractive index of the second section of the silica-based optical waveguide in a longitudinal direction; and radiating interfering light onto the second section of the silica-based optical waveguide, wherein said non-interfering monochromatic light is incoherent light.

* * * * *